United States Patent
Laffranchi et al.

(10) Patent No.: US 11,754,589 B2
(45) Date of Patent: *Sep. 12, 2023

(54) ACCELERATION TRANSDUCER

(71) Applicant: KISTLER HOLDING AG, Winterthur (CH)

(72) Inventors: Marco Laffranchi, Winterthur (CH); Tobias Frommenwiler, Winterthur (CH); David Weber, Seuzach (CH)

(73) Assignee: KISTLER HOLDING AG, Winterthur (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,977

(22) Filed: Oct. 29, 2021

(65) Prior Publication Data

US 2022/0137086 A1 May 5, 2022

(30) Foreign Application Priority Data

Nov. 2, 2020 (EP) ..................... 20205241

(51) Int. Cl.
*G01P 15/09* (2006.01)
*G01P 1/02* (2006.01)
(Continued)

(52) U.S. Cl.
CPC .............. *G01P 15/09* (2013.01); *G01P 1/023* (2013.01); *G01P 15/0802* (2013.01); *G01P 15/0915* (2013.01); *G01P 15/18* (2013.01)

(58) Field of Classification Search
CPC .. G01P 15/0915; G01P 15/09; G01P 15/0907; G01P 15/0922; G01P 15/18; G01P 15/0802; G01P 1/023; G01P 1/02
See application file for complete search history.

(56) References Cited

U.S. PATENT DOCUMENTS

| 4,503,351 A | 3/1985 | Sonderegger et al. |
| 4,613,752 A * | 9/1986 | Davis ..................... G01V 1/181 73/514.27 |

(Continued)

FOREIGN PATENT DOCUMENTS

| CH | 399021 A1 | 3/1966 |
| CN | 201152880 Y | 11/2008 |

(Continued)

OTHER PUBLICATIONS

EPO Search Report, dated May 3, 2021, 15 pages.
The foreign office action with English translation for JP application No. 2021-174422, dated Sep. 30, 2022, 4 pages.

*Primary Examiner* — Helen C Kwok
(74) *Attorney, Agent, or Firm* — Dority & Manning, P.A.

(57) ABSTRACT

An acceleration transducer defines a rectangular coordinate system with two orthogonal horizontal axes that are both normal to a vertical axis and includes a main body disposed within a housing and defining tangential side faces arranged tangentially to the vertical axis, and a normal side face arranged normally to the vertical axis. A piezoelectric element is secured to one of the tangential side faces, and a seismic mass secured to the piezoelectric element. A signal output is attached to the housing and includes a signal conductor spaced apart by an assembly gap from a tangential side face that is not attached to the piezoelectric element. The assembly gap extends perpendicularly to the vertical axis. The normal side face includes main body output conductors spanning the assembly gap in a direction perpendicular to the vertical axis and directly contacting the signal conductor.

13 Claims, 15 Drawing Sheets

(51) Int. Cl.
*G01P 15/08* (2006.01)
*G01P 15/18* (2013.01)

(56) References Cited

U.S. PATENT DOCUMENTS

| | | | |
|---|---|---|---|
| 5,473,941 A | 12/1995 | Judd et al. | |
| 5,512,794 A * | 4/1996 | Kubler | G01P 15/18 310/329 |
| 5,539,270 A * | 7/1996 | Kaji | G01P 15/0922 310/329 |
| 5,996,412 A * | 12/1999 | Hansen | G01P 15/0915 73/514.34 |
| 6,038,924 A * | 3/2000 | Lee | G01P 15/09 310/329 |
| 6,094,984 A * | 8/2000 | Asano | G01P 15/0915 73/514.16 |
| 6,397,677 B1 * | 6/2002 | Kinsley | G01P 15/0915 310/329 |
| 7,066,026 B2 | 6/2006 | Deng | |
| 10,871,504 B2 | 12/2020 | Rosa | |
| 2005/0034519 A1 * | 2/2005 | Deng | G01V 1/16 73/514.34 |
| 2012/0095721 A1 * | 4/2012 | Uwechue | G01P 15/09 702/141 |
| 2014/0123754 A1 * | 5/2014 | Watanabe | G01P 15/09 73/514.01 |
| 2016/0109311 A1 * | 4/2016 | Inazumi | G01L 5/226 73/862.042 |
| 2017/0123088 A1 * | 5/2017 | Faber | G01P 15/097 |
| 2020/0088757 A1 * | 3/2020 | Olivier | G01V 1/184 |
| 2022/0137089 A1 * | 5/2022 | Laffranchi | G01P 15/0915 73/514.34 |
| 2022/0137090 A1 * | 5/2022 | Laffranchi | G01P 15/18 73/514.34 |

FOREIGN PATENT DOCUMENTS

| | | |
|---|---|---|
| DE | 69405962 T2 | 4/1998 |
| EP | 0 546 480 A1 | 6/1993 |
| JP | S62180226 A | 8/1987 |
| JP | H0473870 U | 6/1992 |
| JP | H07198742 A | 8/1995 |
| JP | 2000206140 A | 7/2000 |
| JP | 2001041969 A | 2/2001 |
| RU | 1792537 | 1/1993 |
| WO | WO 86/04137 A1 | 7/1986 |

* cited by examiner

ACCELERATION TRANSDUCER

FIELD OF THE INVENTION

The present invention relates to an acceleration transducer that can be attached to an object and in which movement of a seismic mass against a piezoelectric element lodged against a rigid main body generates electric charges that are collected and processed to yield measurements of forces indicative of acceleration of the object.

BACKGROUND OF THE INVENTION

Accelerations of a physical object are measured in numerous widely varied applications such as robotics, energy generation, transportation, and so on. For this purpose, accelerations are detected in the form of shocks that act onto the physical object and of vibrations of the physical object. Accelerations are indicated as multiples of the gravitational acceleration $g=9.81$ $msec^{-2}$. Typical ranges of detected accelerations are +/−500 g in measuring ranges from 2 Hz to 10 kHz. An acceleration transducer is secured to the physical object for detecting accelerations.

The document CH399021A1, which corresponds to applicant's U.S. Pat. No. 3,673,442 to Sonderegger, which is hereby incorporated herein in its entirety by this reference for all purposes, provides an acceleration transducer of the above-mentioned type comprising a seismic mass, a piezoelectric system and a main body. The acceleration transducer comprises a housing to protect it from harmful environmental impacts which accommodates the seismic mass, the piezoelectric system and the main body. The acceleration transducer is attached to the physical object by means of the housing. When an acceleration occurs, the seismic mass exerts a force that is proportional to its acceleration onto the piezoelectric system. The piezoelectric system comprises a plurality of flat discs made of piezoelectric material having a high sensitivity for the longitudinal piezoelectric effect. Under the action of the exerted force, the piezoelectric material generates piezoelectric charges, and an amount of the piezoelectric charges generated is proportional to the amount of the force. With the longitudinal piezoelectric effect, piezoelectric charges are generated on the those faces of the discs on which the force acts as the normal force. Each disc has two faces on which piezoelectric charges with opposite polarity are generated. Furthermore, the piezoelectric system comprises thin electrodes made of electrically conductive material for picking off the piezoelectric charges from the two end faces. Each electrode has a surface having the size of an end face. With its surface, the electrode is in direct and full contact with the end face. In addition, the piezoelectric system is mechanically pre-loaded between the seismic mass and the main body by means of a pre-loading sleeve. This mechanical pre-loading seals microscopic pores between the end faces and the electrodes so that all generated piezoelectric charges can be tapped; this is important for linearity of the acceleration transducer, linearity meaning the ratio of the number of piezoelectric charges and the amount of the force. The piezoelectric charges can be transmitted electrically and represent the acceleration signals. Electrically transmitted acceleration signals may be electrically transduced in a converter unit.

DE69405962T2, which corresponds to U.S. Pat. No. 6,094,984 to Hiroshi et al, which is hereby incorporated herein in its entirety by this reference for all purposes, also describes an acceleration transducer comprising a seismic mass and a piezoelectric system on a printed circuit board. The acceleration transducer detects accelerations according to the transverse shear effect as a shear force that acts along an axis. The piezoelectric system is arranged between the seismic mass and the printed circuit board. The converter unit is located on the printed circuit board.

Thus, the piezoelectric system of CH399021A1 is only sensitive to a normal force along one axis. Furthermore, the piezoelectric system of DE69405962T2 is only sensitive to a shear force along one axis. However, it would be desirable to have acceleration transducers that are able to simultaneously detect accelerations along a plurality of axes of a rectangular coordinate system.

The document RU1792537C1 discloses an acceleration transducer capable of detecting accelerations in three physical dimensions. To a cube-shaped main body with six surfaces are attached a piezoelectric system with six flat discs made of piezoelectric material and six seismic masses. Two surfaces each are oriented in a direction normal to one of three axes that are perpendicular to each other; this axis will be referred to as the normal axis hereinafter. At each of the six surfaces, a flat disc is introduced between the surface and a seismic mass. The discs are mechanically pre-loaded against the main body by means of an external pre-loading housing. Thus, the piezoelectric system comprises a pair of discs for each of three normal axes. The discs have a high sensitivity for the transverse shear effect. With the transverse shear effect, piezoelectric charges are generated on those end faces of the discs on which a shear force acts tangentially to the normal axis; this axis is referred to as the principal tangential axis hereinafter. Further, the piezoelectric system comprises electrodes made of electrically conductive material for picking off the piezoelectric charges from the end faces of the discs.

According to RU1792537C1, the piezoelectric system comprises a pair of discs made of piezoelectric material and exhibiting a high sensitivity for a shear force acting along a principal tangential axis for each of three normal axes.

Unfortunately, it cannot be avoided that piezoelectric material has more or less high sensitivities for shear forces acting along different axes. Thus, piezoelectric material that has a high sensitivity for a shear force along the principal tangential axis also exhibits a sensitivity, albeit low, for a shear force acting along an axis perpendicular to the principal tangential axis and perpendicular to the normal axis; this axis will be referred to as the secondary tangential axis in the following. Both shear forces, i.e. that acting along the principal tangential axis and that acting along the secondary tangential axis, generate piezoelectric charges on the end faces of the discs. As an example, quartz being a piezoelectric material has a high sensitivity for a shear force along the principal tangential axis that is higher by a factor of 7 than its low sensitivity for a shear force that acts along the secondary tangential axis.

Therefore, the low sensitivity of the piezoelectric material for a shear force that acts along the secondary tangential axis may falsify the detection of the shear force along the principal tangential axis, and the respective piezoelectric charges will be referred to as piezoelectric interference charges hereinafter. RU1792537C1 discloses to electrically connect the pair of discs with opposite polarity in series for each of the three normal axes to avoid this falsification. This has the advantage that a shear force acting along the secondary tangential axis will generate the same number of piezoelectric interference charges on the end faces of each of the two discs, which piezoelectric interference charges, however, have the opposite polarity and neutralize each other when tapped in series.

Moreover, the document EP0546480A1, which corresponds to applicant's U.S. Pat. No. 5,512,794 to Kuebler et al, which is hereby incorporated herein in its entirety by this reference for all purposes, describes an acceleration transducer that comprises a piezoelectric system for detecting accelerations with high sensitivity according to the transverse shear effect as shear forces acting along three principal tangential axes that are perpendicular to each other. In an embodiment as shown in FIG. 8, the piezoelectric system consists of six discs made of piezoelectric material, and a pair of discs with opposite polarity is electrically connected in series for each of the three principal tangential axes. The acceleration transducer needs only three seismic masses, one for each of the three principal tangential axes. Piezoelectric interference charges originating from shear forces along the secondary tangential axes are neutralized for each of the three principal tangential axes when they are tapped in series.

Furthermore, U.S. Pat. No. 5,539,270 to Kaji et, which is hereby incorporated herein in its entirety by this reference for all purposes, relates to an acceleration transducer for detecting accelerations in three physical dimensions. A piezoelectric system for each dimension is provided, and each piezoelectric system comprises two plates made of piezoelectric material. End faces facing each other of the two plates are materially bonded to each other. The material connection is electrically insulating. On those end faces of the plates that face away from each other are attached electrodes that pick off piezoelectric charges generated under the action of a normal force. The three piezoelectric systems are mechanically attached to a support. The support comprises electrical conductors for conducting the piezoelectric charges away from the electrodes. Seismic masses are not provided.

There is often limited space available for attaching the acceleration transducer to the physical object. Therefore, the acceleration transducer should have small outer dimensions of less than 50 cm$^3$. Furthermore, measuring frequencies of more than 10 kHz are desired. Also, the acceleration transducer should have a small weight since its resonant frequency is inversely proportional to its weight.

U.S. Pat. No. 7,066,026 to Deng, which is hereby incorporated herein in its entirety by this reference for all purposes, relates to an acoustic vector sensor or particle sensor that employs three piezoelectric crystals in the form of relaxor single crystals, which are crystal plates cut at a special orientation such that they provide zero or minimum responses in the transverse directions, but have maximum piezoelectric response in the sensing direction. The relaxor crystals are mounted between a rigid case and a proof mass with a reduced bonding area between the proof mass and the relaxor crystal to try to deal with the clamping effect associated with the relaxor crystal.

The document CN201152880Y discloses an acceleration transducer comprising a piezoelectric system, a seismic mass, and a main body. The main body has a cylindrical shape and terminates in a normal end face along a vertical axis. Along a normal axis perpendicular to the vertical axis the piezoelectric system is mechanically pre-loaded between the main body and the seismic mass by means of a pre-loading sleeve. The pre-loading sleeve is hollow-cylindrical in shape and ends in a lateral surface in a plane of the normal end face of the main body. The seismic mass is formed as a disc and also ends in a lateral surface in the plane of the normal end face of the main body. A converter unit in the form of a charge amplifier is arranged in this plane on the lateral surfaces of the pre-loading sleeve and seismic mass as well as on the normal end face of the main body, thus saving space.

However, this arrangement of the converter unit on lateral surfaces of the pre-loading sleeve and seismic mass as well as on the normal end face of the main body presents a disadvantage of the introduction of a force shunt that forms between the seismic mass and the main body. As a result, the seismic mass no longer can oscillate freely under the effect of an acceleration, and a force acting onto the piezoelectric system due to the inertia of the seismic mass is impeded so that the force is no longer proportional to the acceleration. In addition, the piezoelectric charges generated by the piezoelectric material are no longer proportional to the acceleration to be detected. Thus, the force shunt falsifies the acceleration measurement.

EXEMPLARY OBJECTS AND SUMMARY OF THE INVENTION

One object of the present invention to provide an acceleration transducer capable of simultaneously detecting an acceleration in a plurality of physical dimensions. Another object of the invention is to provide an acceleration transducer that detects an acceleration as free from falsification as possible. According to a further object of the present invention, the acceleration transducer shall have small outer dimensions and a low weight. An additional object of the invention is to provide an acceleration transducer configured for high measuring frequencies of over 10 kHz. And according to a still further object of the invention, the configuration of the acceleration transducer should lend itself to being produce at low cost.

At least one of these objects has been achieved by the features described herein.

The present invention relates to an acceleration transducer comprising a main body having tangential side faces and normal side faces, said tangential side faces being arranged tangentially to a vertical axis and said normal side faces being arranged normally to the vertical axis; further comprising at least one piezoelectric element attached to a tangential side face; at least one seismic mass attached to the piezoelectric element; and a housing and a signal output, said signal output being secured to the housing and comprising signal conductors; wherein a tangential side face at which no piezoelectric element is attached is spaced apart from the signal conductors by an assembly gap that extends perpendicularly to the vertical axis; wherein a first normal side face or a support attached to a first normal side face comprises main body output conductors; and wherein the main body output conductors spanning the assembly gap in a direction perpendicular to the vertical axis are directly contacted with the signal conductors.

The invention has the advantage that all side faces of the main body are optimally used in a space-saving manner. At least one piezoelectric element and one seismic mass is attached to a tangential side face. For detecting accelerations in three physical dimensions, two additional piezoelectric elements and two additional seismic masses may be attached to two additional tangential side faces. Thus, the main body together with the piezoelectric element and seismic mass may be produced in advance and stored as an intermediate product, allowing the acceleration transducer to be manufactured at low cost. When needed, the intermediate product may be attached to the housing via a normal side face. The housing protects the piezoelectric element from harmful environmental impacts. For this purpose, the housing advantageously comprises a housing opening for inserting the intermediate product in an interior of the housing. The signal output comprises signal conductors for the transmission of acceleration signals of the acceleration transducer from the inside of the housing. According to the invention, one tangential side face remains vacant for arranging the main body as close as possible to the signal conductors, only spaced apart by an assembly gap.

This is because main body output conductors are arranged on another normal side face or on a support. The other normal side face and the signal conductors are readily accessible for a contacting tool through the housing opening. Thus, the intermediate product can be directly contacted with the signal conductors via the main body output conductors, while for this purpose the main body output conductors only have to span the assembly gap, which is done easily and quickly, also contributing to cost-effectiveness of the assembly.

The disclosure herein suffices to inform persons of ordinary skill in the field of the invention of further advantageous embodiments of the invention not explicitly described herein.

BRIEF DESCRIPTION OF THE DRAWINGS OF EXEMPLARY EMBODIMENTS

In the following, the invention will be explained in more detail by means of exemplary embodiments referring to the figures in which.

DETAILED DESCRIPTION OF EXEMPLARY EMBODIMENTS OF THE INVENTION

Figure 1:
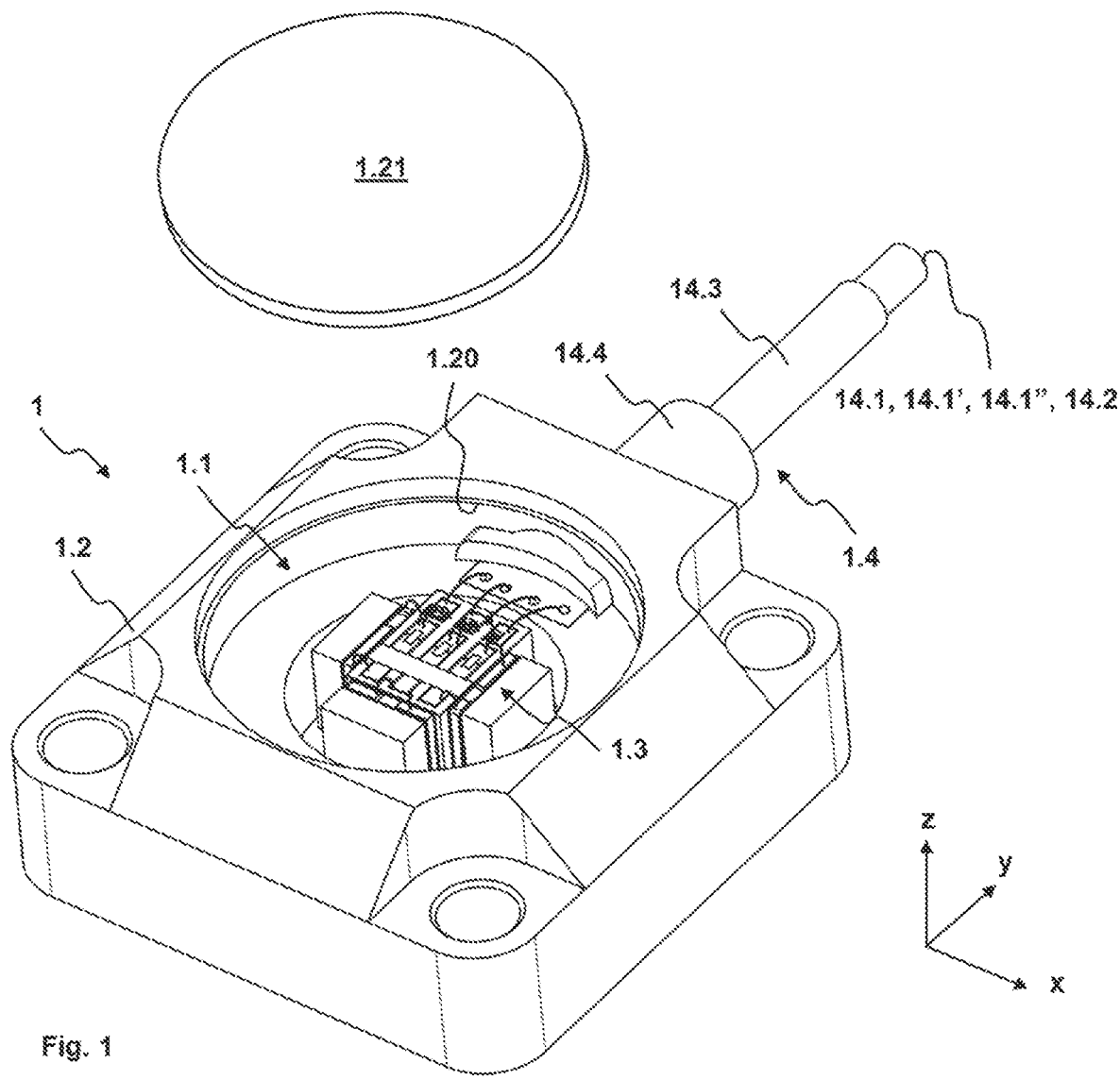
FIG. 1 shows a view of a portion of a first embodiment of an acceleration transducer comprising a transducer unit.
Figure 2:
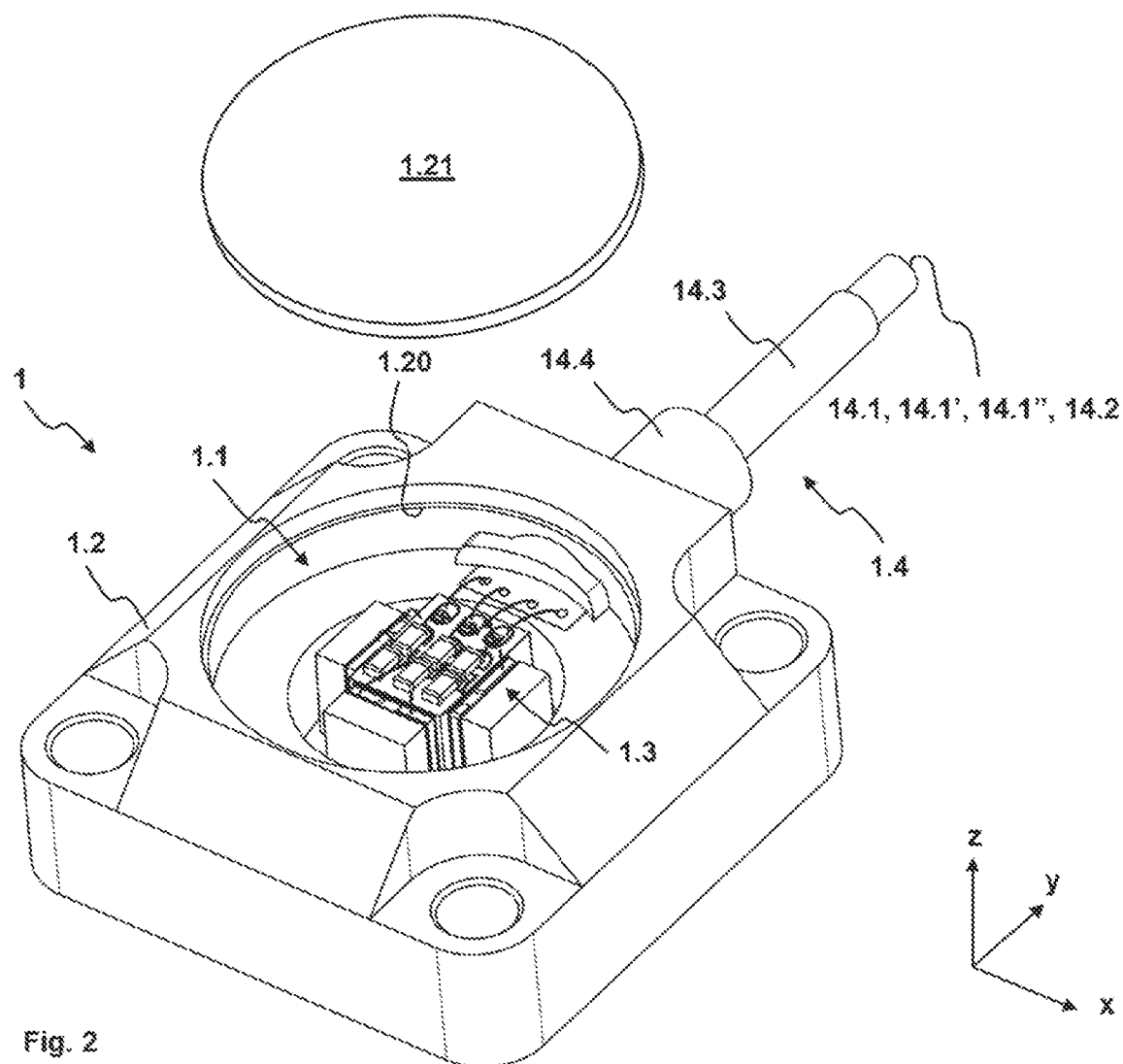
FIG. 2 shows a view of a portion of a second embodiment of an acceleration transducer comprising a transducer unit.

FIGS. 1 and 2 show a portion of each of two embodiments of an acceleration transducer 1 according to the invention. The acceleration transducer 1 is arranged in a rectangular coordinate system with three axes x, y, z also referred to as the transverse axis x, the longitudinal axis y and the vertical axis z. Acceleration transducer 1 comprises a transducer unit 1.1, a housing 1.2, a converter unit 1.3 and a signal output 1.4.

Figure 14:
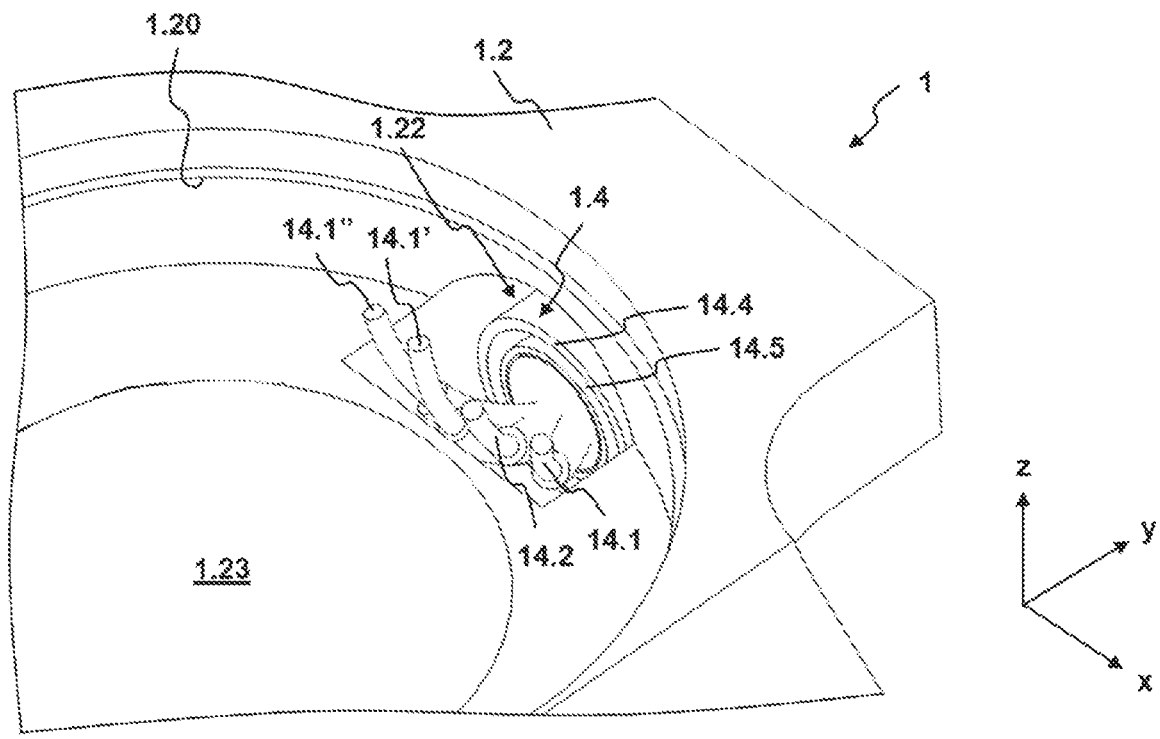
FIG. 14 shows a view of a first step in the assembly of the acceleration transducer according to FIG. 2 in which signal conductors are introduced into a housing.
Figure 15:
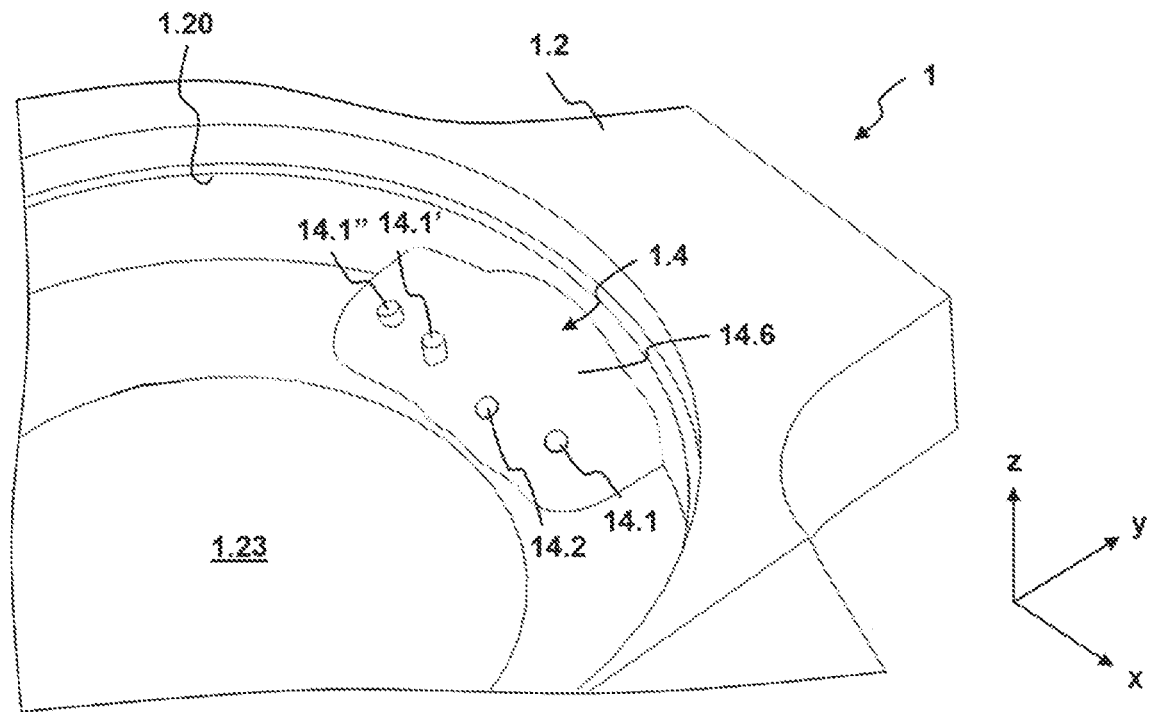
FIG. 15 shows a view of a second step in the assembly of the acceleration transducer according to FIG. 2 in which the signal conductors are cast in casting compound within the housing.
Figure 16:
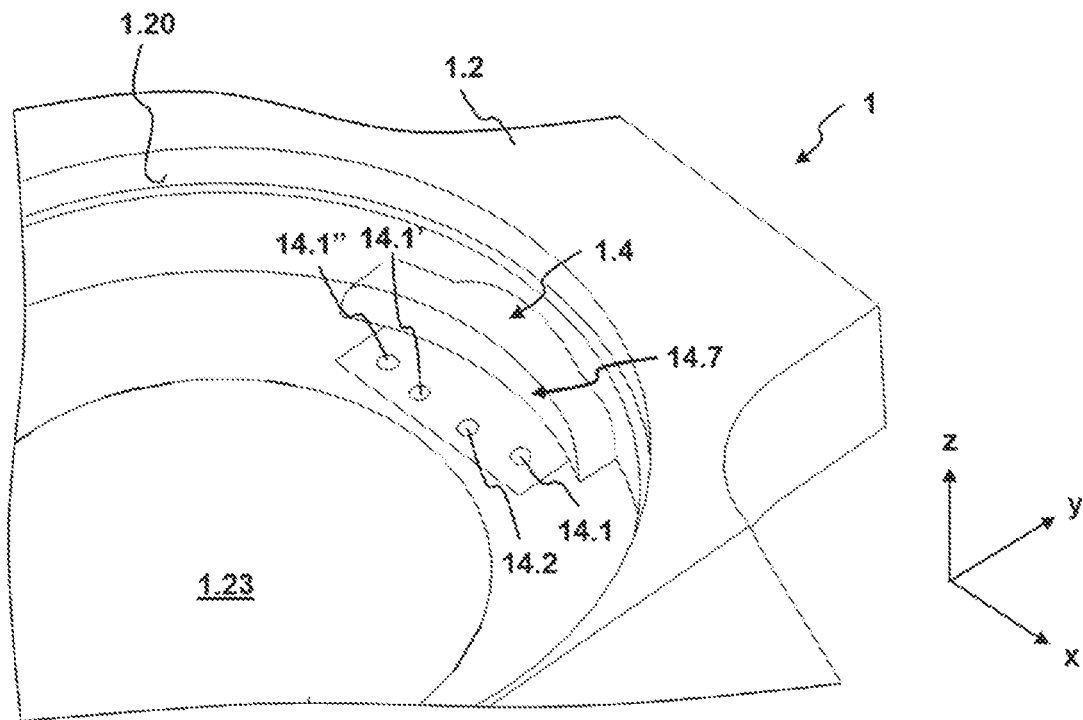
FIG. 16 shows a view of a third step in the assembly of the acceleration transducer according to FIG. 2 in which the signal conductors cast in casting compound are exposed in some areas within the housing.

The housing 1.2 protects the acceleration transducer 1 from harmful environmental impacts such as contamination (dust, moisture, etc.) and from electrical and electromagnetic interference effects in the form of electromagnetic radiation. The housing 1.2 is made of mechanically resistant material such as pure metals, nickel alloys, cobalt alloys, iron alloys, etc. The housing 1.2 has a rectangular cross-section with a width along the transverse axis x of preferably less than 5 cm, with a length along the longitudinal axis y of preferably less than 5 cm, and with a height along the vertical axis z of preferably less than 2 cm so that it has small outer dimensions defining a volume of less than 50 cm$^3$. As schematically shown in FIGS. 14-16 for example, the interior of the housing 1.2 has the shape of a pot or a well and is defined by a housing opening 1.20 and a housing bottom 1.23. The dimension of the housing opening 1.20 is such that the transducer unit 1.1 can be introduced into the housing 1.2 and be secured to the housing bottom 1.23 and connected to the signal output 1.4 through the housing opening 1.20. In the context of the present invention, the term "connection" is understood to mean an electrical and mechanical connection. The housing opening 1.20 can be sealed by a housing cover 1.21. Preferably, it is sealed by means of material bonding such as welding, soldering, gluing, etc. In use, the acceleration transducer 1 is configured to be attached to a physical object whose acceleration is to be detected by means of the housing 1.2. Any method of attachment may be chosen.

Figure 3:
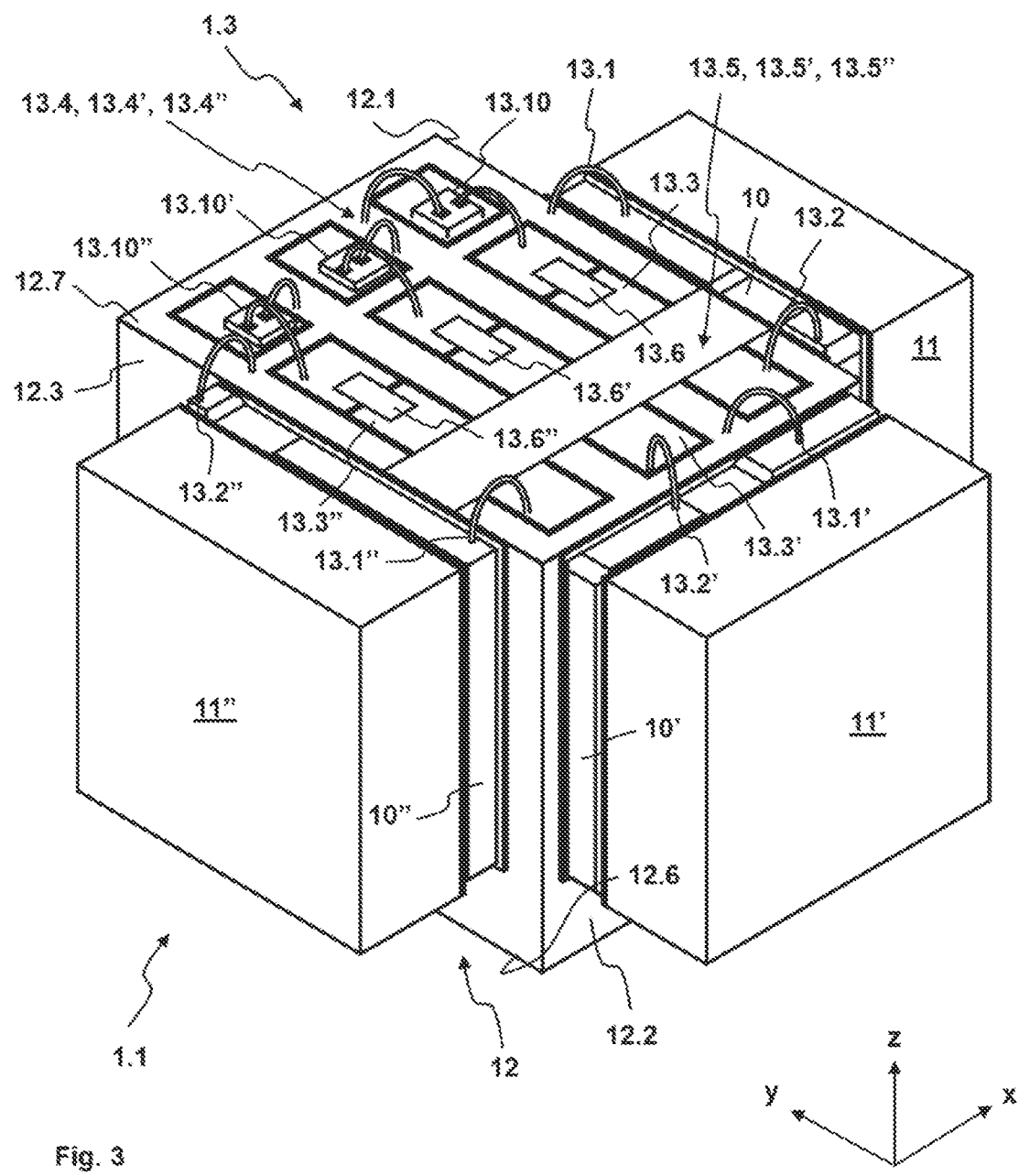
FIG. 3 shows a view of a transducer unit comprising a converter unit of the acceleration transducer according to FIG. 1.

As schematically shown in FIG. 3 for example, the transducer unit 1.1 comprises first, second and third piezoelectric elements 10, 10', 10", first, second and third seismic masses 11, 11', 11" and a main body 12. The first, second and third piezoelectric elements 10, 10', 10" and the first, second and third seismic masses 11, 11', 11" are attached to the main body 12. The main body 12, in turn, is attached to the housing 1.2. Preferably, though not shown in FIG. 3, the main body 12 is attached to the bottom 1.23 of the housing 1.2 by means of material bonding such as gluing, soldering, etc.

The first, second and third piezoelectric elements 10, 10', 10" are made of piezoelectric material such as quartz ($SiO_2$ single crystal), calcium gallo-germanate ($Ca_3Ga_2Ge_4O_{14}$ or CGG), langasite ($La_3Ga_5SiO_{14}$ or LGS), tourmaline, gallium orthophosphate, piezoceramics, etc. The first, second, and third piezoelectric elements 10, 10', 10" have a high sensitivity for the force to be measured. The first, second and third piezoelectric elements 10, 10', 10" are rectangular in cross-section, with a surface area of preferably less than 1 cm$^2$ and a thickness of preferably less than 2 mm. This disclosure suffices to inform those skilled in the art that the present invention may be carried out using piezoelectric elements with different shapes and cross-sections such as circular, etc.

Preferably, the first, second and third seismic masses 11, 11', 11" are made of high-density material such as iridium, platinum, tungsten, gold, etc. For small outer dimensions of the acceleration transducer 1, the first, second and third seismic masses 11, 11', 11" will have a high density of preferably more than 19 g/cm$^3$. The first, second and third seismic masses 11, 11', 11" are rectangular in cross-section having a surface area that is preferably smaller than 1 cm$^2$ and a thickness that is preferably smaller than 5 mm. Those skilled in the art being aware of the present invention may also use seismic masses with different shapes and cross-sections such as circular, etc. Furthermore, a person skilled in the art may use seismic masses that are made of material with lower density such as steel, ceramics, etc.

Figure 5:
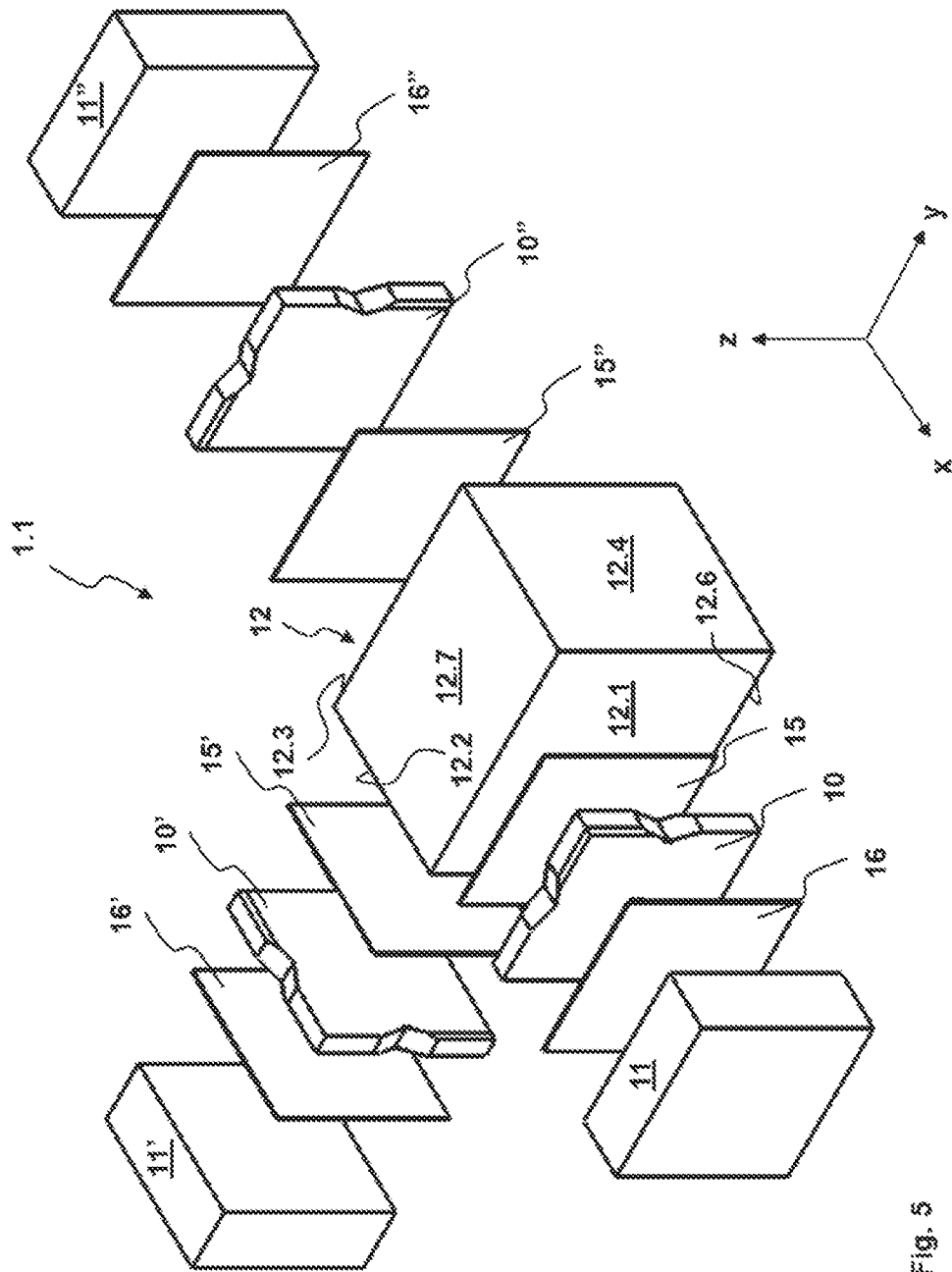
FIG. 5 shows an exploded view of a portion of the transducer unit according to FIGS. 1 to 4.

The main body 12 is made of mechanically stiff material having a low density such as $Al_2O_3$, ceramics, $Al_2O_3$ ceramics, sapphire, etc. Mechanical stiffness of the main body 12 is required for inelastic transmission of an acceleration to be detected from the housing 1.1 onto the first, second and third seismic masses 11, 11', 11". For high mechanical stiffness of the acceleration transducer 1, the main body 12 has a high modulus of elasticity of preferably 350 GPa to 470 GPa. For a low weight of the acceleration transducer 1, the main body 12 has a low density of preferably less than 4 g/cm$^3$. As schematically shown in FIG. 5 for example, the main body 12 is preferably a cube with six side faces 12.1, 12.2, 12.3, 12.4, 12.6, 12.7. Four tangential side faces 12.1, 12.2, 12.3, 12.4 are arranged tangentially with respect to the vertical axis z and parallel to the vertical axis z, which is disposed normally to the two normal side faces 12.6, 12.7. The size of each of the side faces 12.1, 12.2, 12.3, 12.4, 12.6, 12.7 desirably is the same size. Each side face 12.1, 12.2, 12.3, 12.4, 12.6, 12.7 desirably has a surface area of less than 1 cm$^2$. In the context of the present invention, the adverb "essentially" has the meaning of "+/−10%". Each of the x, y, z axes is normal to two of the side faces, and each of the x and y axes is parallel to two of the side faces. Those skilled in the art and knowing the present invention may use a main body with a different shape and differently shaped surfaces such as circular, etc.

Figure 4:
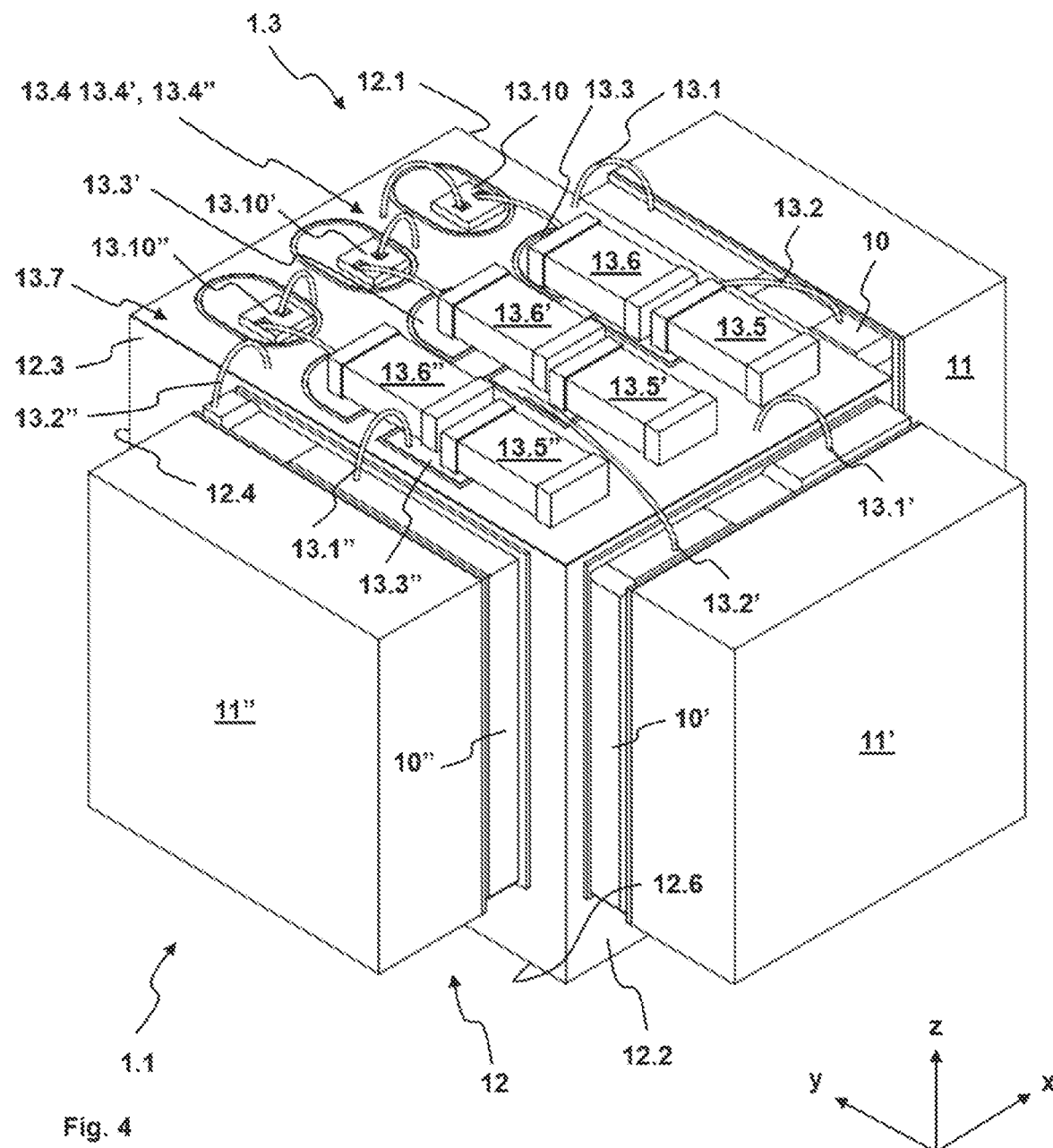
FIG. 4 shows a view of a transducer unit comprising a converter unit of the acceleration transducer according to FIG.2.
Figure 6:
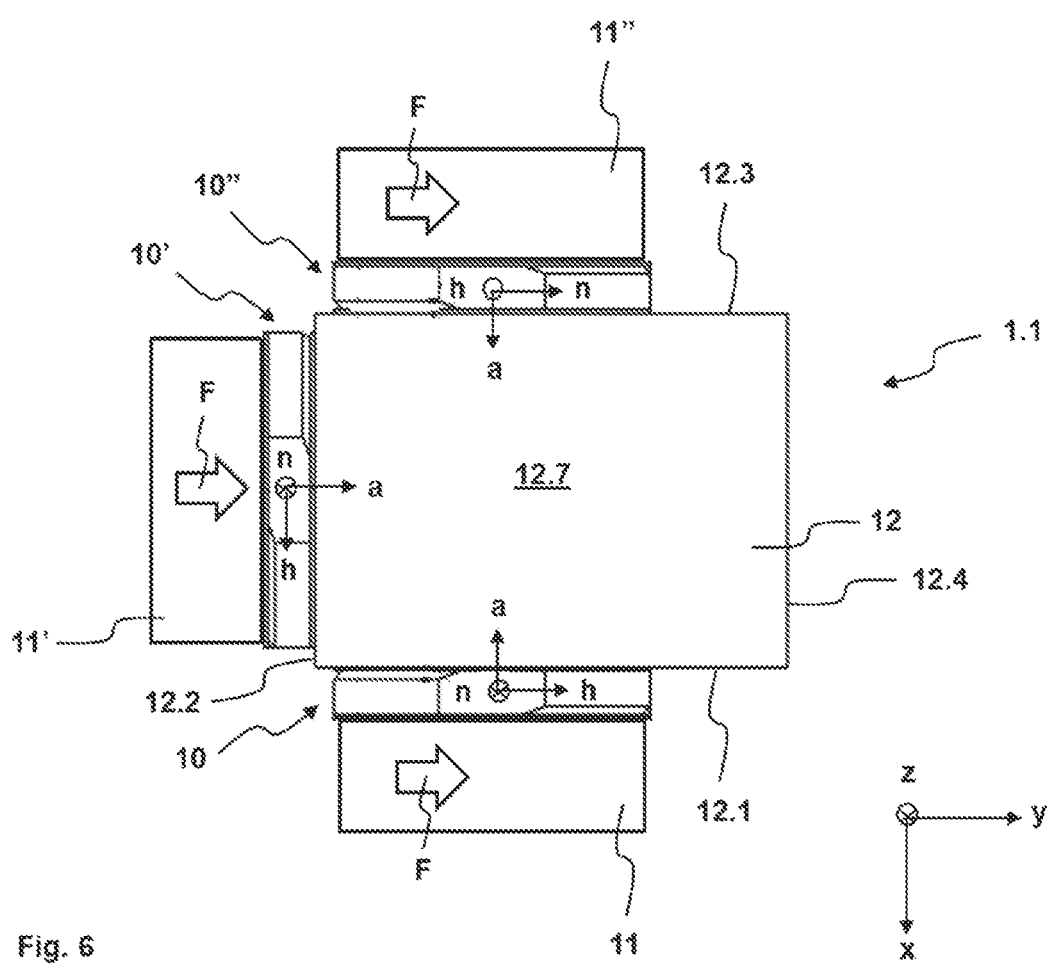
FIG. 6 shows a top view of the transducer unit according to FIGS. 1 to 5 under the effect of an acceleration.

As schematically shown in FIGS. 3 and 4, a first seismic mass 11 and a first piezoelectric element 10 are attached to a first tangential side face 12.1 of the main body 12. A second seismic mass 11' and a second piezoelectric element 10' are attached to a second tangential side face 12.2 of the main body 12. A third seismic mass 11" and a third piezoelectric element 10" are attached to a third tangential side face 12.3 of the main body 12. Here, each of the piezoelectric elements 10, 10', 10" is arranged between a tangential side face 12.1, 12.2, 12.3 and a seismic mass 11, 11', 11", respectively. As schematically shown in FIGS. 5 and 6, a fourth tangential side face 12.4 is vacant.

The attachment of the first, second and third seismic masses 11, 11', 11" and the first, second and third piezoelectric elements 10, 10', 10" on the main body 12 is achieved by first, second and third inner connection means 15, 15', 15" and first, second and third outer connection means 16, 16', 16". Each of these attachments desirably is carried out by means of material bonding such as gluing, thermal compression bonding, etc. Such mechanical attachment of the first, second and third seismic masses 11, 11', 11" and the first, second and third piezoelectric elements 10, 10', 10" by means of first, second and third inner connecting means 15, 15', 15" and first, second and third outer connecting means 16, 16', 16" facilitates the assembly of the acceleration transducer 1 and can be performed quickly and in a cost-effective manner.

The first, second and third inner connecting means 15, 15', 15" and the first, second and third outer connecting means 16, 16', 16" desirably is an adhesive that can be chemically cured or physically hardened or a combination of adhesives that can be chemically cured and physically hardened. Preferably, each of the first, second and third inner connecting means 15, 15', 15" and the first, second and third outer 16, 16', 16" consists of an adhesive such as epoxy, polyurethane, cyanoacrylate, methyl methacrylate, etc. Each of the first, second and third inner connecting means 15, 15', 15" and the first, second and third outer connecting means 16, 16', 16" is an electrical insulator having an electrical resistivity of more than $10^{12}$ $\Omega mm^2/m$.

As shown in FIG. 5, the first piezoelectric element 10 is attached via a first inner connecting means 15 to the first tangential side face 12.1. The first seismic mass 11 is attached via a first outer connecting means 16 to the first piezoelectric element 10. The second piezoelectric element 10' is attached via a second inner connecting means 15' to the second tangential side face 12.2. The second seismic mass 11' is attached via a second external connection means 16' to the second piezoelectric element 10'. The third piezoelectric element 10" is attached via a third inner connecting means 15" to the third tangential side face 12.3. The third seismic mass 11" is attached via a third outer connecting means 16" to the third piezoelectric element 10".

Preferably, each of the first, second and third piezoelectric elements 10, 10', 10" is attached respectively by the first, second and third inner connecting means 15, 15', 15" and the first, second and third outer connecting means 16, 16', 16" to the first, second and third seismic masses 11, 11', 11" and the main body 12 in a manner resistant to shear forces.

Each first, second and third inner connecting means 15, 15', 15" and each first, second and third outer connecting means 16, 16', 16" is rectangular in cross-section having a surface area of preferably less than 1 cm$^2$ and a thickness of preferably less than 0.1 mm. Those skilled in the art being aware of the present invention may also use inner and outer connecting means of different shapes and cross-sections such as circular, etc.

Figure 7:
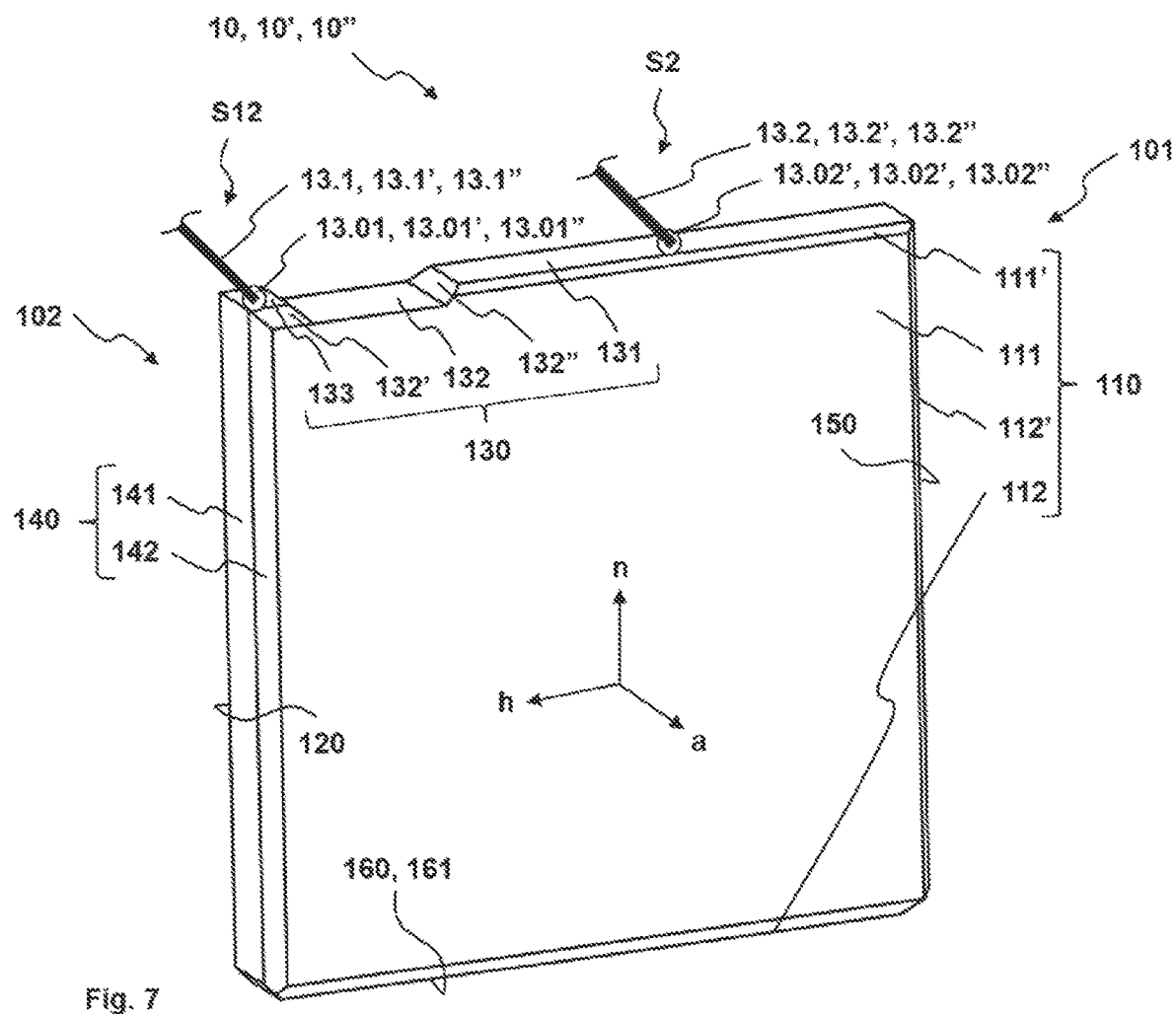
FIG. 7 shows a first view of a first embodiment of a piezoelectric element of the transducer unit according to FIGS. 1 to 5.

As schematically shown in FIG. 7, the first, second and third piezoelectric elements 10, 10', 10" have a high sensitivity for the transverse shear effect along a principal tangential axis h and have a low sensitivity for the transverse shear effect along a secondary tangential axis n as well as a low sensitivity for the piezoelectric transverse effect along a normal axis a. The principal tangential axis h is a different one of the three axes x, y, z for each of the three piezoelectric elements 10, 10', 10". The secondary tangential axis n is a different one of the three axes x, y, z for each of the three piezoelectric elements 10, 10', 10". The normal axis a is a different one of the three axes x, y, z for each of the three piezoelectric elements 10, 10', 10".

The transverse shear effect along the principal tangential axis h or the secondary tangential axis n generates piezoelectric charges on the same end faces of the first, second and third piezoelectric elements 10, 10', 10" as those onto which a shear force is applied along the principal tangential axis h or the secondary tangential axis n.

The piezoelectric transverse effect generates piezoelectric charges on lateral surfaces of the first, second, and third piezoelectric elements 10, 10', 10", which lateral surfaces are perpendicular to the end faces of the first, second, and third piezoelectric elements 10, 10', 10" onto which a normal force acts along a normal axis a.

The higher the sensitivity, the more piezoelectric charges are generated for a given amount of force. For the purposes of the present invention, the terms "high sensitivity" and "low sensitivity" are related to each other. Each of the three piezoelectric elements 10, 10', 10" with a high sensitivity for a shear force along a principal tangential axis h generates at least by a factor of 5, more piezoelectric charges per unit force compared to a low sensitivity for a shear force along a secondary tangential axis n or for a normal force along a normal axis a.

Thus, the piezoelectric material is chosen so that mainly piezoelectric charges generated by the transverse shear effect along the principal tangential axis h are taken into account in the detection of an acceleration. In the disclosure herein, the piezoelectric charges generated according to the transverse shear effect along the secondary tangential axis n and those generated according to the piezoelectric transverse effect along the normal axis a will be referred to as piezoelectric interference charges.

FIG. 6 schematically shows a top view of the transducer unit 1.1 during an acceleration. The acceleration causes the first, second and third seismic masses 11, 11', 11" to exert a force F onto end faces of the first, second and third piezoelectric elements 10, 10', 10". In the example schematically shown in FIG. 6, the force F acts parallel along the longitudinal axis y as shown by the direction in which the arrows designated F are pointing.

Referring to FIG. 6, the first piezoelectric element 10 has a high sensitivity for a shear force along the longitudinal axis y being its principal tangential axis h. Since the force F acts along the longitudinal axis y, the first piezoelectric element 10 generates piezoelectric charges for the force F according to the transverse shear effect on its end faces. The first piezoelectric element 10 has a low sensitivity for a shear force acting along the vertical axis z being its secondary tangential axis n, and a low sensitivity for a normal force acting along the transverse axis x being its normal axis a. The force F acts along the longitudinal axis y where it exerts a torque around the vertical axis z. The first piezoelectric element 10 generates piezoelectric interference charges according to the transverse shear effect on its end faces for this torque.

Referring to FIG. 6, the second piezoelectric element 10' exhibits a high sensitivity for a shear force along the transverse axis x being its principal tangential axis h. However, the force F acts along the longitudinal axis y, and the second piezoelectric element 10' does not generate piezoelectric charges on its end faces for the force F acting in the direction along the longitudinal axis y. The second piezoelectric element 10' has a low sensitivity for a shear force acting along the vertical axis z being its secondary tangential axis n, and a low sensitivity for a normal force acting along the longitudinal axis y being its normal axis a. Since the force F acts along the longitudinal axis y, the second piezoelectric element 10' generates piezoelectric interference charges according to the piezoelectric transverse effect on the lateral surfaces of the second piezoelectric element 10'.

Moreover, still referring to FIG. 6, the third piezoelectric element 10" exhibits a high sensitivity for a shear force along the vertical axis z being its principal tangential axis h. However, the force F acts as a shear force along the longitudinal axis y, and the third piezoelectric element 10" does not generate piezoelectric charges on its end faces for the force F acting as a shear force along the longitudinal axis y. The third piezoelectric element 10" has a low sensitivity for a shear force acting along the longitudinal axis y being its secondary tangential axis n, and a low sensitivity for a normal force along the transverse axis x being its normal axis a. The force F acts along the longitudinal axis y and exerts a torque around the vertical axis z. The third piezoelectric element 10" generates piezoelectric interference charges according to the transverse shear effect on its end faces for this torque.

Figure 8:
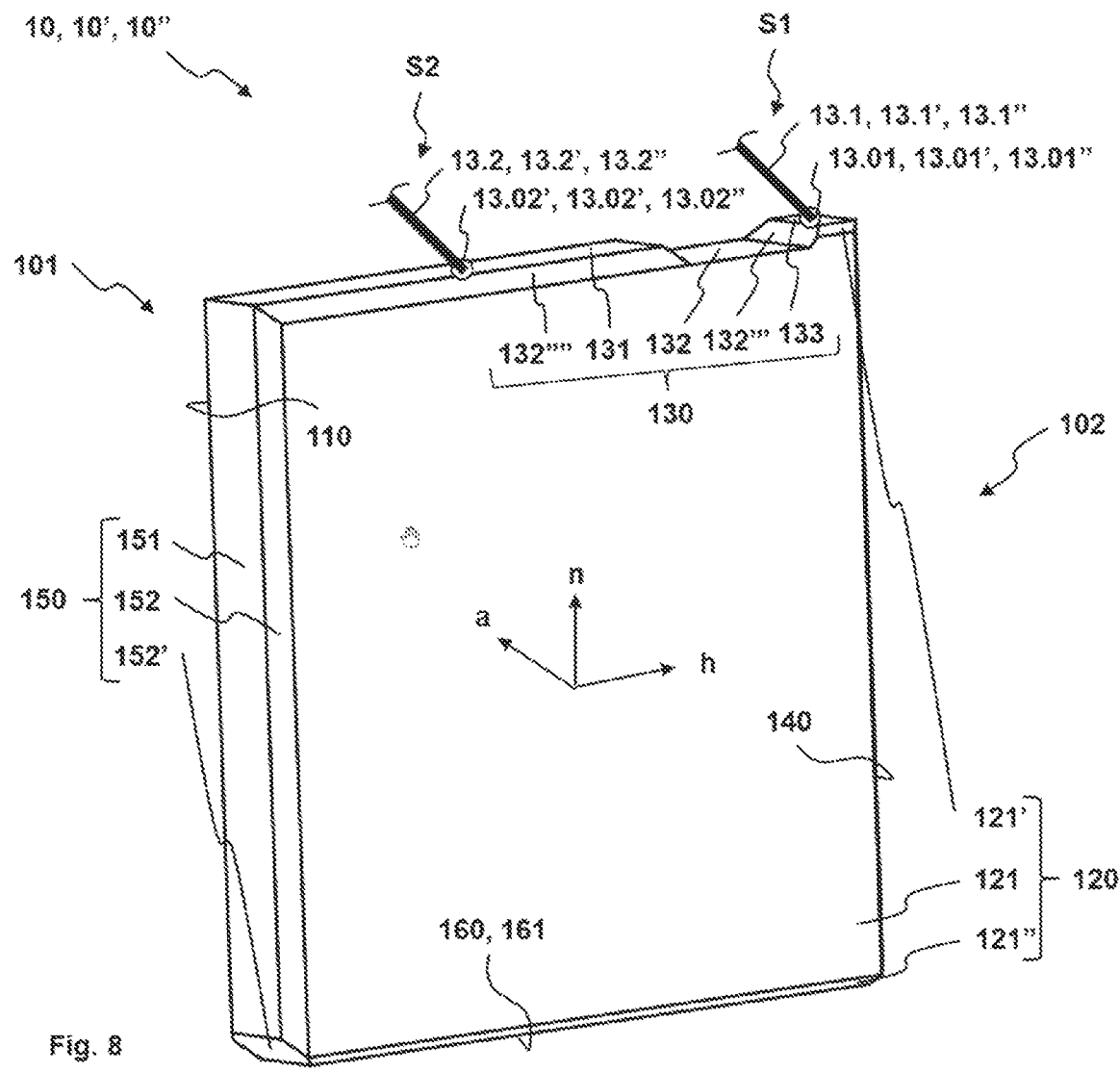
FIG. 8 shows a second view of the embodiment of the piezoelectric element according to FIG. 7.
Figure 9:
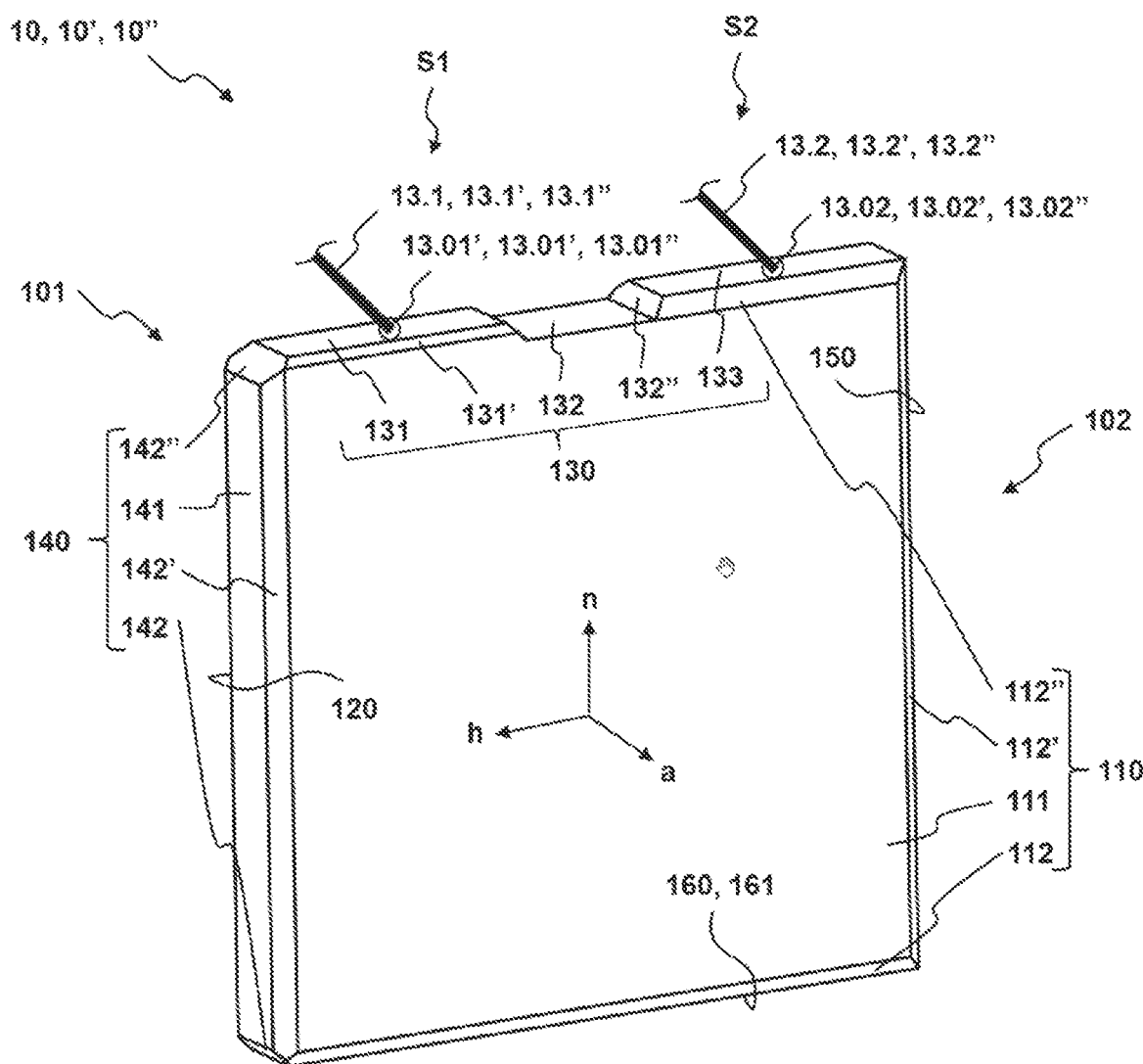
FIG. 9 shows a first view of a second embodiment of a piezoelectric element of the transducer unit according to FIGS. 1 to 5.
Figure 10:
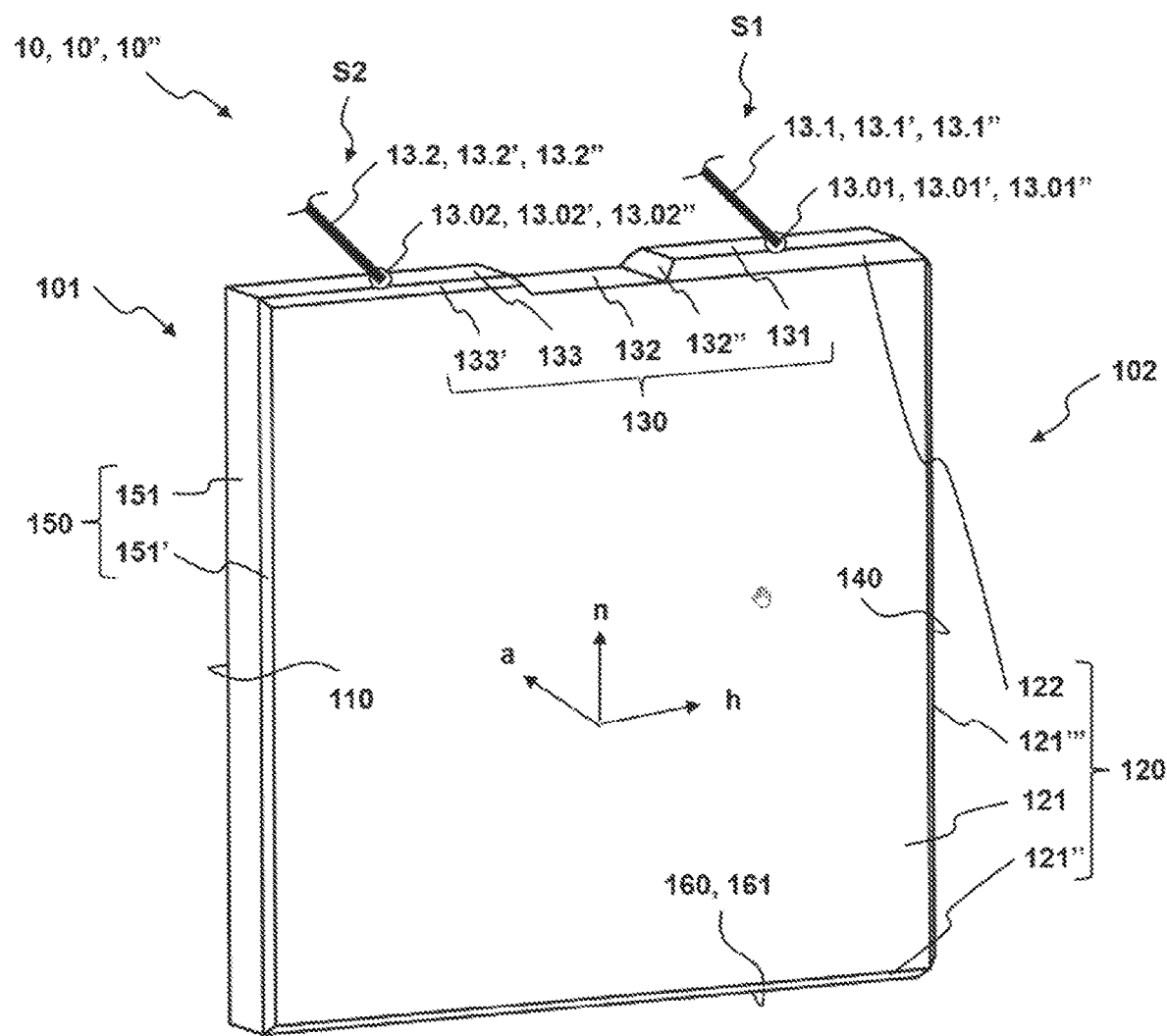
FIG. 10 shows a second view of the second embodiment of the piezoelectric element according to FIG. 9.

FIGS. 7 and 8 show a detailed view of a first embodiment of a first, second or third piezoelectric element 10, 10', 10" of the transducer unit 1.1. FIGS. 9 and 10 show a detailed view of a second embodiment of a first, second or third piezoelectric element 10, 10', 10" of the transducer unit 1.1. The first, second or third piezoelectric element 10, 10', 10" comprises two end faces 110, 120 and four lateral surfaces 130, 140, 150, 160.

Each of the three piezoelectric elements 10, 10', 10" comprises a first end face 110 and a second end face 120. Wherein each end face 110, 120 lies in a plane defined by the principal tangential axis h and the secondary tangential axis n. In each plane defining an end face 110, 120, the secondary tangential axis n is perpendicular to the principal tangential axis h. Further, the normal axis a is normal to the plane defining an end face 110, 120. Under the action of a shear force along the principal tangential axis h, each of the three piezoelectric elements 10, 10', 10" generates piezoelectric charges on the two end faces 110, 120. Moreover, under the action of a shear force along the secondary tangential axis n, each of the three piezoelectric elements 10, 10', 10" generates piezoelectric interference charges on the two end faces 110, 120. Each of the three piezoelectric elements 10, 10', 10" comprises lateral surfaces 130, 140, 150, 160. The lateral surfaces 130, 140, 150, 160 are parallel to the normal axis a. The lateral surfaces 130, 140, 150, 160 comprise a first lateral surface 130, a second lateral surface 140, a third lateral surface 150 and a fourth lateral surface 160. The first lateral surface 130 and the fourth lateral surface 160 are normal to the secondary tangential axis n of the piezoelectric element 10, 10', 10". The second lateral surface 140 and the third lateral surface 150 are normal to the principal tangential axis h of the piezoelectric element 10, 10', 10".

When a normal force acts along the normal axis a, each of the three piezoelectric elements 10, 10', 10" generates piezoelectric interference charges on the four lateral surfaces 130, 140, 150, 160.

Thus, the piezoelectric charges generated for the shear force that shall be measured are generated on only two end faces 110, 120 of the piezoelectric elements. In addition, piezoelectric interference charges are generated both on the two end faces 110, 120 and the four lateral surfaces 130, 140, 150, 160.

An electrically conductive end face coating 111, 121 covers at least in some areas of the end faces 110, 120. A size of the area of the electrically conductive end face coating 111, 121 may be between 90% and 100% of the end faces 110, 120. Similarly, an electrically conductive lateral surface coating 131, 141, 151, 161 covers some areas of the lateral surfaces 130, 140, 150, 160. A size of the area of the electrically conductive lateral surface coating 131, 141, 151, 161 may be between 0% and 100% of the lateral surfaces 130, 140, 150, 160. The electrically conductive end face coating 111, 121 and the electrically conductive lateral surface coating 131, 141, 151, 161 may be produced by thermal lamination of a metal film or by metal deposition. Electrically conductive materials such as copper, copper alloys, gold, gold alloys, aluminum, aluminum alloys, silver, silver alloys, etc., may be used as the metal. Each of the electrically conductive end face coatings 111, 121 and each of the electrically conductive lateral surface coatings 131, 141, 151, 161 preferably has a thickness of less than 0.1 mm.

Thus, in accordance with an aspect of the present invention, instead of true electrodes, the acceleration transducer 1 only comprises an electrically conductive end face coating 111, 121 and an electrically conductive lateral surface coating 131, 141, 151, 161. Thus, in accordance with an aspect of the present invention, the acceleration transducer 1 contains fewer components which saves space and reduces costs of production by facilitating the assembly of the acceleration transducer 1.

Moreover, mechanical pre-loading of the first, second or third piezoelectric element 10, 10', 10" is not required due to the electrically conductive end face coating 111, 121 and the electrically conductive lateral surface coating 131, 141, 151, 161. The reason is that the electrically conductive end face coating 111, 121 and the electrically conductive lateral surface coating 131, 141, 151, 161 are in material contact with the end faces 110, 120 and the lateral surfaces 130, 140, 150, 160 and seal microscopic pores in the end faces 110, 120 and the lateral surfaces 130, 140, 150, 160. Due to this sealing of microscopic pores, it is no longer necessary to provide the acceleration transducer 1 with separate pre-loading means such as a pre-loading sleeve according to CH399021A1 or a pre-loading housing according to RU1792537C1. This results in fewer components which saves space and weight and reduces costs of production by facilitating the assembly of the acceleration transducer 1.

Referring to FIGS. 7 and 8, according to the first embodiment of a first, second or third piezoelectric element 10, 10', 10" the first end face 110 schematically shown in FIG. 7 comprises two first electrically conductive end face coatings 111, 111' in some areas thereof and two first uncoated end face areas 112, 112' in some areas thereof. Furthermore, the second end face 120 schematically shown in FIG. 8 comprises two more electrically conductive end face coatings 121, 121', 121" in some areas thereof. The first lateral surface 130 comprises a first electrically conductive lateral surface coating 131 in some areas thereof, another first electrically conductive lateral surface coating 133 in some areas thereof, and a plurality of uncoated first lateral surface areas 132, 132', 132", 132''', 132'''' in some areas thereof. The second lateral surface 140 schematically shown in FIG. 8 comprises a second electrically conductive lateral surface coating 141 in some areas thereof and a second uncoated lateral surface area 142 in some areas thereof. The third lateral surface 150 schematically shown in FIG. 7 comprises a third electrically conductive lateral surface coating 151 in some areas thereof as well as two third uncoated lateral surface areas 152, 152' in some areas thereof. The fourth lateral surface 160 comprises a fourth electrically conductive lateral surface coating 161 in some areas thereof.

According to the first embodiment of a first, second, or third piezoelectric element 10, 10', 10" as shown in FIGS. 7 and 8, the two first electrically conductive end face coatings 111, 111', the further first electrically conductive lateral surface coating 133, and the third electrically conductive lateral surface coating 151 form a first continuous electrically conductive coating 101. The plurality of second electrically conductive end face coatings 121, 121', 121", the first electrically conductive lateral surface coating 131, the second electrically conductive lateral surface coating 141, and the fourth electrically conductive lateral surface coating 161 form a second continuous electrically conductive coating 102.

For the purposes of the present invention, the adjective "continuous" has the meaning of "connected in an electrically conductive manner." The first continuous electrically conductive coating 101 receives first piezoelectric charges that are generated on surfaces of the first, second or third piezoelectric element 10, 10', 10" below the first continuous electrically conductive coating 101 as the first acceleration signals S1. The second continuous electrically conductive coating 102 receives second piezoelectric charges that are generated on surfaces of the first, second, or third piezoelectric element 10, 10', 10" below the second continuous electrically conductive coating 102 as the second acceleration signals S2. The first and second piezoelectric charges have opposite electrical polarity (or sign). Thus, either the first piezoelectric charges have a negative sign and the second piezoelectric charges have a positive sign, or the first piezoelectric charges have a positive sign and the second piezoelectric charges have a negative sign.

Preferably, the first electrically conductive end face coating 111 and the first electrically conductive lateral surface coating 131 form the first continuous electrically conductive coating 101. Preferably, the second electrically conductive end face coating 121 and the further first electrically conductive lateral surface coating 133 form the second continuous electrically conductive coating 102. Preferably, at least one second, third or fourth electrically conductive lateral surface coating 141, 151, 161 is part of the first continuous electrically conductive coating 101 or part of the second continuous electrically conductive coating 102.

According to the first embodiment of a first, second or third piezoelectric element 10, 10', 10" as shown in FIGS. 7 and 8, the first and second continuous electrically conductive coatings 101, 102 are electrically insulated from one another by two first uncoated end face areas 112, 112', a plurality of first uncoated lateral surface areas 132, 132', 132", 132''', a second uncoated lateral surface area 142 and two third uncoated lateral surface areas 152, 152'.

According to the second embodiment of a first, second, or third piezoelectric element 10, 10', 10" as shown in FIGS. 9 and 10, the first end face 110 comprises a first electrically conductive end face coating 111 in some areas thereof and a plurality of first uncoated end face areas 112, 112', 112" in some areas thereof. Furthermore, the second end face 120 schematically shown in FIG. 10 comprises a plurality of second electrically conductive end face coatings 121, 121", 121''' in some areas thereof and a second uncoated end face area 122 in some areas thereof. The first lateral surface 130 comprises a first electrically conductive lateral surface coating 131 in some areas thereof, two additional first electrically conductive lateral surface coatings 133, 133' in some areas thereof, and a plurality of uncoated first lateral surface areas 132, 132', 132" in some areas thereof. The second lateral surface 140 comprises a second electrically conductive lateral surface coating 141 in some areas thereof and a plurality of second uncoated lateral surface areas 142, 142', 142" in some areas thereof. The third lateral surface 150 comprises a third electrically conductive lateral surface coating 151 in some areas thereof and a third uncoated lateral surface area 152, 152' in some areas thereof. The fourth lateral surface 160 comprises a fourth electrically conductive lateral surface coating 161 in some areas thereof.

According to the second embodiment of a first, second or third piezoelectric element 10, 10', 10" as shown in FIGS. 9 and 10, the plurality of first electrically conductive end face coatings 112, 112', 112" and the two first electrically conductive lateral surface coatings 131, 131' form a first continuous electrically conductive coating 101. The plurality of second electrically conductive end face coatings 121, 121', 121", the two additional first electrically conductive lateral surface coatings 133, 133', the second electrically conductive lateral surface coating 141, the third electrically conductive lateral surface coating 151, and the fourth electrically conductive lateral surface coating 161 form a second continuous electrically conductive coating 102.

According to the second embodiment of a first, second or third piezoelectric element 10, 10', 10" as shown in FIGS. 9 and 10, the electrically conductive lateral surface coatings 131, 131' of the first continuous electrically conductive coating 101 receive piezoelectric interference charges for the normal force along the normal axis a, which piezoelectric interference charges have a polarity opposite to that of the piezoelectric interference charges received by the first electrically conductive end face coating 111 of the first continuous electrically conductive coating 101 for the shear force along the secondary tangential axis n. In addition, the electrically conductive lateral surface coatings 133, 141, 151, 161 of the second continuous electrically conductive coating 102 receive piezoelectric interference charges for the normal force acting along the normal axis a, which piezoelectric interference charges have an electrical polarity that is opposite to that of the piezoelectric interference charges received by the second electrically conductive end face coating 121, 121", 121''' of the second continuous electrically conductive coating 102 for the shear force acting along the secondary tangential axis n.

According to the second embodiment of a first, second or third piezoelectric element 10, 10', 10" as shown in FIGS. 9 and 10, the first electrically conductive coating 101 and the second electrically conductive coating 102 are electrically insulated from one another by a plurality of first uncoated end face areas 112, 112', 112", a second uncoated end face area 122, a plurality of first uncoated lateral surface areas 132, 132', 132", a plurality of second uncoated lateral surface areas 142, 142', 142", and a third uncoated lateral surface area 152.

A ratio of the size of the first electrically conductive coating 131 and the size of the further first electrically conductive coating 133 may be adjusted by a relative position and/or size of the first uncoated lateral surface areas 132, 132', 132", 132''', 132'''' of the first lateral surface 130. In the context of the invention, the pair of conjunctions "and/or" means that either only one of the conjunctions or both of the conjunctions apply.

A ratio of the size of the first electrically conductive coating 131 and the size of the further first electrically conductive coating 133 may be adjusted by a relative position of the first uncoated lateral surface areas 132, 132', 132", 132''', 132'''' of the first lateral surface 130 with respect to the second and third lateral surfaces 140, 150. Depending on the relative position of the first uncoated lateral surface areas 132, 132', 132", 132''', 132'''' of the first lateral surface 130 that is moved further towards the second lateral surface 140 or further towards the third lateral surface 150, the ratio of the size of the first electrically conductive coating 131 and the size of the further first electrically conductive coating 133 may be reduced or increased accordingly. According to the first embodiment of a first, second or third piezoelectric element 10, 10', 10" as shown in FIGS. 7 and 8, the first uncoated lateral surface areas 132, 132', 132''', 132" are positioned relatively close to the second lateral surface 140. According to the second embodiment of a first, second or third piezoelectric element 10, 10', 10" as shown in FIGS. 9 and 10, the first uncoated lateral surface areas 132, 132', 132" are positioned at essentially the same distance from the second 140 and third lateral surface 150.

However, a ratio of the size of the first electrically conductive coating 131 and the size of the further first electrically conductive coating 133 may also be adjusted by increasing or decreasing the size of the first uncoated lateral surface areas 132, 132', 132''', 132'''' of the first lateral surface 130. According to the first embodiment of a first, second or third piezoelectric element 10, 10', 10" as shown in FIGS. 7 and 8, the first uncoated lateral surface areas 132, 132', 132", 132''', 132'''' have essentially twice the size of the further first electrically conductive coating 133, and the first uncoated lateral surface areas 132, 132', 132''', 132''', 132'''' are essentially five times smaller than the first electrically conductive coating 131. According to the second embodiment of a first, second or third piezoelectric element 10, 10', 10" as shown in FIGS. 9 and 10, the first uncoated lateral surface areas 132, 132', 132" have essentially the same size as the first electrically conductive coating 131, 131' and the further first electrically conductive coating 133.

Preferably, the electrically conductive lateral surface coatings of the first electrically conductive coating 101 receive piezoelectric interference charges for the normal force along the normal axis a, which piezoelectric interference charges have an electrical polarity that is opposite to that of the piezoelectric interference charges received by the first electrically conductive end face coating of the first electrically conductive coating 101 for the shear force acting along the secondary tangential axis n. In addition, the electrically conductive lateral surface coatings of the second electrically conductive coating 102 receive piezoelectric interference charges for the normal force along the normal axis a, which piezoelectric interference charges have an electrical polarity opposite to that of the piezoelectric interference charges received by the second electrically conductive end face coating of the second electrically conductive coating 102 for the shear force along the secondary tangential axis n.

Preferably, a size of the electrically conductive lateral surface coatings of the first continuous electrically conductive coating 101 is such that the number of piezoelectric interference charges received for the normal force along the normal axis a by the electrically conductive lateral surface coatings is essentially the same as the number of piezoelectric interference charges received for the shear force along the secondary tangential axis n by the first electrically conductive end face coating of the first continuous electrically conductive coating 101. Furthermore, the electrically conductive lateral surface coatings of the second continuous electrically conductive coating 102 receive essentially the same number of piezoelectric interference charges for the normal force along the normal axis a as are received for the shear force along the secondary tangential axis n by the second electrically conductive end face coating of the second continuous electrically conductive coating 102.

In contrast to RU1792537C1, the shear force is detected according to the invention by only one piezoelectric element 10, 10', 10" per axis. Thus, it is not possible to eliminate piezoelectric interference charges resulting from a shear force acting along a secondary tangential axis n and which would falsify the measurement of the shear force along the principal tangential axis h by connecting two piezoelectric elements with opposite polarity per axis in series. Therefore, the acceleration transducer 1 of the invention uses a different solution. This is based on the fact that the piezoelectric material also generates piezoelectric interference charges for a normal force acting along a normal axis a on lateral surfaces 130, 140, 150, 160. These piezoelectric interference charges also falsify the detection of the shear force along the principal tangential axis h. For this reason, these piezoelectric interference charges are usually not picked off from the lateral surfaces 130, 140, 150, 160. However, it has now been found that the occurrence of a shear force along a secondary tangential axis n is accompanied by a normal force acting along a normal axis a. While piezoelectric interference charges are generated on the end faces 110, 120 for the former, piezoelectric interference charges are generated on the lateral surfaces 130, 140, 150, 160 for the latter. These two types of piezoelectric interference charges interfere with the detection of the shear force along the principal tangential axis h. By using suitable first and second continuous electrically conductive coatings 101, 102, it is possible to electrically connect the end faces 110, 120 and the lateral surfaces 130, 140, 150, 160 in series and to eliminate the piezoelectric interference charges that interfere with the detection of the shear force along the principal tangential axis h. This advantageous result is accomplished by having an equal number of piezoelectric interference charges of opposite electrical polarity, cancel each other to yield a zero net charge.

Figure 11:
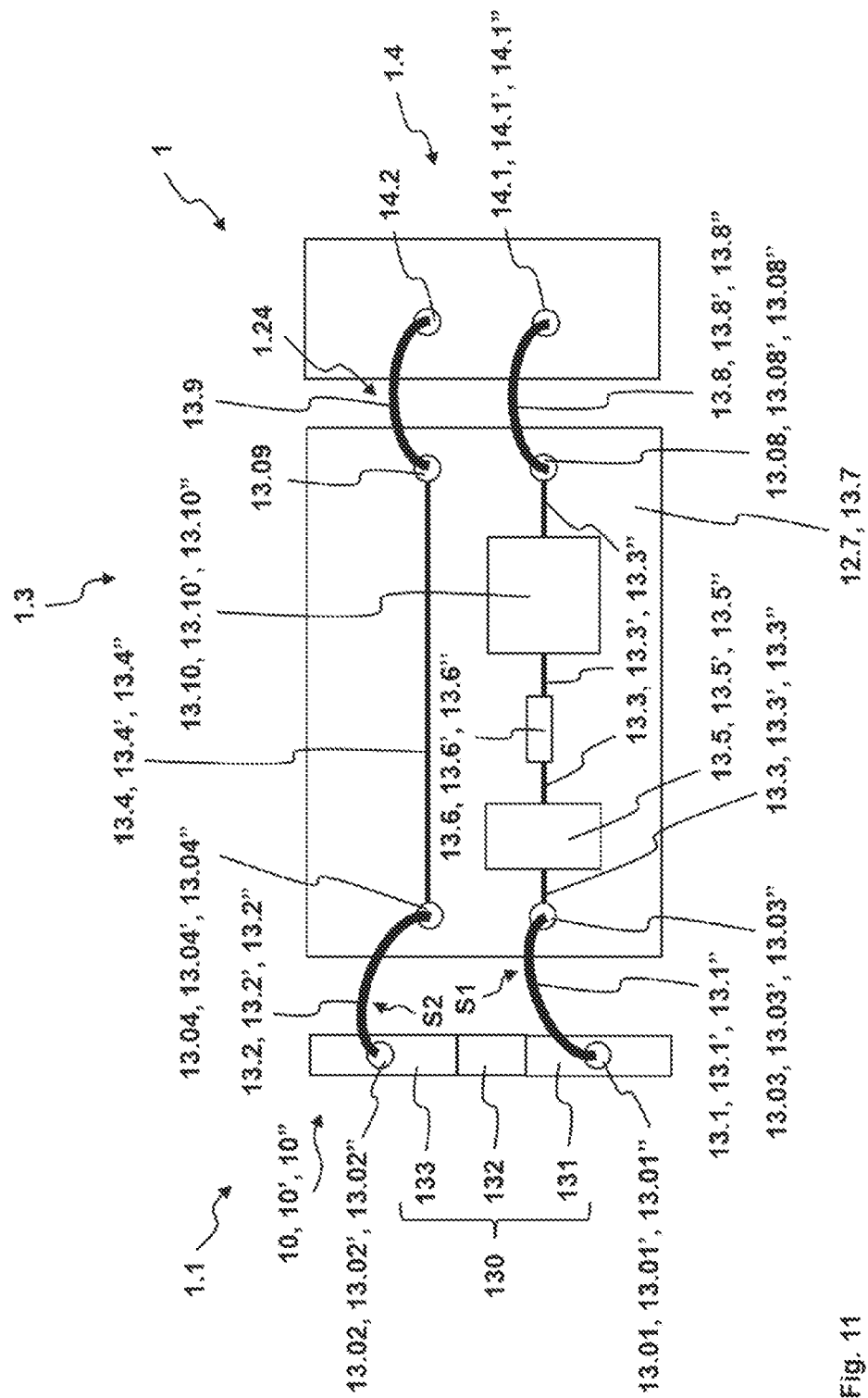
FIG. 11 shows a schematic representation of the transmission of the piezoelectric charges of the transducer unit according to FIGS. 1 to 5.

FIG. 11 is a schematic representation of the transmission of the piezoelectric charges of the transducer unit 1.1. A portion of a first, second or third piezoelectric element 10, 10', 10" with the first lateral surface 130 and a portion of the converter unit 1.3 as well as a portion of the signal output 1.4 are shown.

The converter unit 1.3 is capable of converting first acceleration signals S1. The converter unit 1.3 comprises at least first and second piezoelectric element conductors 13.1, 13.1', 13.1", 13.2, 13.2', 13.2", at least first and second main body conductors 13.3, 13.3', 13.3", 13.4, 13.4', 13.4", at least one transimpedance converter 13.10, 13.10', 13.10", and at least first and second signal output conductors 13.8, 13.8', 13.8", 13.9. Furthermore, the converter unit 1.3 comprises at least one first electrical resistor 13.5, 13.5', 13.5", and/or at least one second electrical resistor 13.6, 13.6', 13.6".

In a first embodiment of the acceleration transducer 1 as shown in FIGS. 1 and 3, the converter unit 1.3 is only and directly arranged on the main body 12. Preferably, the converter unit 1.3 is only and directly arranged on a first normal side face 12.7 of the main body 12. In a second embodiment of the acceleration transducer 1 as shown in FIGS. 2 and 4, the converter unit 1.3 is only arranged on a support 13.7. The support 13.7 is made of electrically insulating material such as $Al_2O_3$, ceramics, $Al_2O_3$ ceramics, fiber-reinforced plastics, etc. The support 13.7 is secured to the main body 12. Preferably, the support 13.7 is attached to the first normal side face 12.7 of the main body 12 by means of material bonding such as gluing, soldering, etc.

The first and second piezoelectric element conductors 13.1, 13.1', 13.1", 13.2, 13.2', 13.2", the first and second main body conductors 13.3, 13.3', 13.3", 13.4, 13.4', 13.4", the first electrical resistor 13.5, 13.5', 13.5", the second electrical resistor 13.6, 13.6', 13.6", and the transimpedance converter 13.10, 13.10', 13.10" are attached to a first normal side face 12.7 (first embodiment of the acceleration transducer 1 according to FIGS. 1 and 3) or to the support 13.7 (second embodiment of the acceleration transducer 1 according to FIGS. 2 and 4).

The first and second piezoelectric element conductors 13.1, 13.1', 13.1", 13.2, 13.2', 13.2", the first and second main body conductors 13.3, 13.3', 13.3", 13.4, 13.4', 13.4", and the first and second signal output conductors 13.8, 13.8', 13.8", 13.9 are made of electrically conductive material such as copper, copper alloys, gold, gold alloys, aluminum, aluminum alloys, etc. and have a diameter of 0.02 mm to 0.10 mm and are mechanically flexible.

The first and second piezoelectric element conductors 13.1, 13.1', 13.1", 13.2, 13.2', 13.2", the first and second main body conductors 13.3, 13.3', 13.3", 13.4, 13.4', 13.4" as well as first and second signal output conductors 13.8, 13.8', 13.8", 13.9 conduct first and second acceleration signals S1, S2 in a manner insulated from ground. In the context of the present invention, the term "insulated from ground" means electrically insulated from a grounding of the acceleration transducer 1. Preferably, the housing 1.2 of the acceleration transducer 1 is grounded; the housing 1.2 has the same electrical potential as the local ground. Thus, acceleration signals S1, S2 are conducted in a manner electrically insulated from an electrical potential of the acceleration transducer 1. In this way, the acceleration measurement is not falsified by variations in the electrical potential of the acceleration transducer 1, for example between the housing 1.2 and the converter unit 1.3.

Preferably, the first and second main body conductors 13.3, 13.3', 13.3", 13.4, 13.4', 13.4" are patterned in an electrically conductive coating. The electrically conductive coating is formed by chemical vapor deposition, physical vapor deposition, etc. The electrically conductive coating is made of electrically conductive material such as copper, copper alloys, gold, gold alloys, platinum, platinum alloys, etc. The electrically conductive coating is an electrically conductive thin film. In the context of the present invention, the term "thin film" means that the thickness of the electrically conductive coating in a direction perpendicular to its planar extension is preferably less than 0.1 mm. The electrically conductive coating is applied directly to the first normal side face 12.7 (first embodiment of the acceleration transducer 1 according to FIGS. 1 and 3) or the support 13.7 (second embodiment of the acceleration transducer 1 according to FIGS. 2 and 4). In the context of the present invention, the adverb "directly" means "immediately". Preferably, patterning of the first and second main body conductors 13.3, 13.3', 13.3", 13.4, 13.4', 13.4" in the electrically conductive coating is carried out by stenciling, photolithography and laser ablation.

Preferably, the converter unit 1.3 comprises three first piezoelectric element conductors 13.1, 13.1', 13.1' and three second piezoelectric element conductors 13.2, 13.2', 13.2". One of the three first piezoelectric element electrical conductors 13.1, 13.1', 13.1" transmits first acceleration signals S1 from the first electrically conductive coating 101 of a respective one of the first, second or third piezoelectric element 10, 10', 10" to the converter unit 1.3. Similarly, one of the three second piezoelectric element electrical conductors 13.2, 13.2', 13.2" transmits second acceleration signals S2 from the second electrically conductive coating 102 of a respective one of the first, second or third piezoelectric element 10, 10', 10" to the converter unit 1.3.

The first and second piezoelectric element conductors 13.1, 13.1', 13.1", 13.2, 13.2', 13.2" are in contact with the first lateral surface 130. This is because the first lateral surface 130 is available and plays a specific technical role, i.e. it has piezoelectric element contacts 13.01, 13.01', 13.01" provided thereon for transmitting the piezoelectric charges which saves space. A first piezoelectric element conductor 13.1, 13.1', 13.1" each contacts the first lateral surface electrical coating 131 via a first piezoelectric element contact 13.01, 13.01', 13.01". A second piezoelectric element conductor 13.2, 13.2', 13.2" each contacts the second lateral surface electrical coating 133 via a second piezoelectric element contact 13.02, 13.02', 13.02". The first and second piezoelectric element contacts 13.01, 13.01', 13.01", 13.02, 13.02', 13.02" are attached to the first lateral surface 130. The first and second piezoelectric element contacts 13.01, 13.01', 13.01", 13.02, 13.02', 13.02" are a material bond made by wire bonding, soldering, etc. Methods such as thermocompression bonding, thermosonic ball wedge bonding, ultrasonic wedge bonding, etc. are suitable for wire bonding. The circular first and second piezoelectric element contacts 13.01, 13.01', 13.01", 13.02, 13.02', 13.02" in FIG. 11 schematically represent formed wire.

The converter unit 1.3 preferably comprises three first and second main body conductors 13.3, 13.3', 13.3", 13.4, 13.4', 13.4". One first piezoelectric element conductor 13.1, 13.1', 13.1" each contacts a first main body conductor 13.3, 13.3', 13.3" via a first main body access contact 13.03, 13.03', 13.03". One second piezoelectric element conductor 13.2, 13.2', 13.2" each contacts a second main body conductor 13.4, 13.4', 13.4" via a second main body access contact 13.04, 13.04', 13.04". The first and second main body access contacts 13.03, 13.03', 13.03", 13.04, 13.04', 13.04" are attached to the first normal side face 12.7 (first embodiment of the acceleration transducer 1 according to FIGS. 1 and 3) or to the support 13.7 (second embodiment of the acceleration transducer 1 according to FIGS. 2 and 4). The first and second main body access contacts 13.03, 13.03', 13.03", 13.04, 13.04', 13.04" are a material bond made by wire bonding, soldering, etc. Methods such as thermocompression bonding, thermosonic ball wedge bonding, ultrasonic wedge bonding, etc. are suitable for wire bonding. The circular first and second main body access contacts 13.03, 13.03', 13.03", 13.04, 13.04', 13.04" in FIG. 11 schematically represent formed wire.

The first electrical resistor 13.5, 13.5', 13.5", the second electrical resistor 13.6, 13.6', 13.6" and the transimpedance converter 13.10, 13.10', 13.10" are electrically connected to each other by the first main body conductors 13.3, 13.3', 13.3". The second main body conductors 13.4, 13.4', 13.4" with the second acceleration signals S2 of the first, second and third piezoelectric elements 10, 10', 10" are electrically short-circuited and at an electrical reference potential of the converter unit 1.3. The electrical reference potential is a stabilized, i.e., temporally constant, direct electrical voltage.

Preferably, the converter unit 1.3 comprises three transimpedance converters 13.10, 13.10', 13.10". The three transimpedance converters 13.10, 13.10', 13.10" have an identical structure. In the embodiments according to FIGS. 1 and 2, the transimpedance converter 13.10, 13.10', 13.10" is an electronic component. The transimpedance converter 13.10, 13.10', 13.10" is secured to the first normal side face 12.7 (first embodiment of the acceleration transducer 1 according to FIGS. 1 and 3) or to the support 13. 7 (second embodiment of the acceleration transducer 1 according to FIGS. 2 and 4) by a material bond via an intermediate, and/or the transimpedance converter 13.10, 13.10', 13.10" is secured to the first and second main body conductors 13.3, 13.3', 13.3", 13.4, 13.4', 13.4" via the intermediate. The intermediate is an adhesive that can be chemically cured, an adhesive that can be physically hardened, a solder, etc. Preferably, the intermediate is an adhesive such as epoxy, polyurethane, cyanoacrylate, methyl methacrylate, etc. One first main body conductor 13.3, 13.3', 13.3" each contacts a respective transimpedance converter 13.10, 13.10', 13.10". Any contacting method may be chosen. One first main body conductor 13.3, 13.3', 13.3" each transmits first acceleration signals S1 to an input of a transimpedance converter 13.10, 13.10', 13.10". Preferably, the input of the transimpedance converter 13.10, 13.10', 13.10' has a high impedance of more than $10^7 \Omega$. The transimpedance converter 13.10, 13.10', 13.10" converts the first acceleration signals S1 into electrical voltages. The converted first acceleration signals S1 are provided at an output of a transimpedance converter 13.10, 13.10', 13.10". Preferably, the output of the transimpedance converter 13.10, 13.10', 13.10' has a low impedance of less than $10^2 \Omega$. However, instead of using a transimpedance converter, those skilled in the art knowing the present invention may also use a charge amplifier with low electrical resistance at an input of the charge amplifier.

Figure 12:
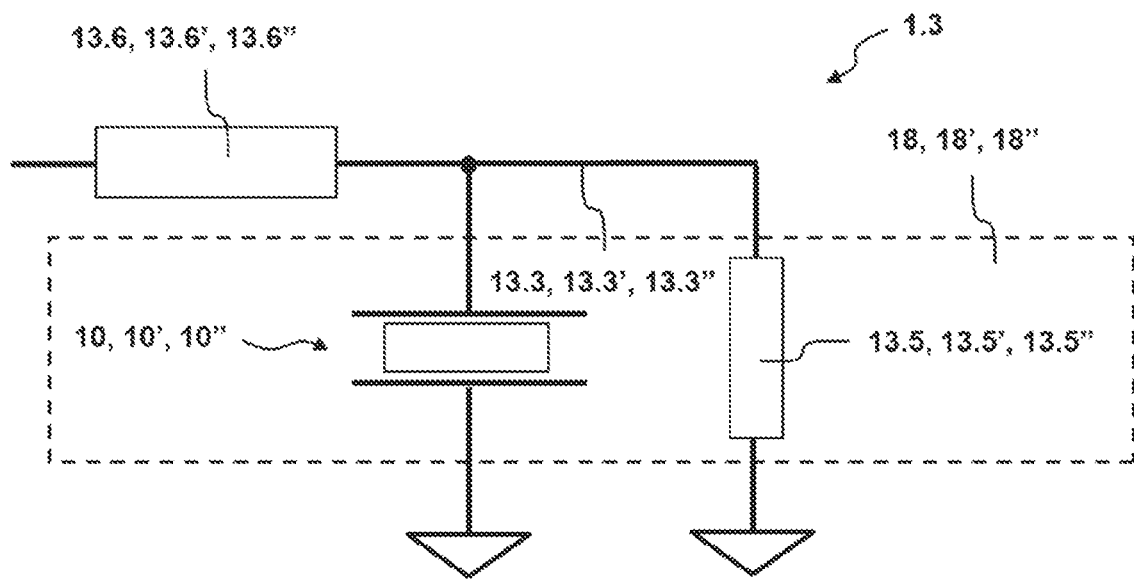
FIG. 12 shows a schematic representation of a high-pass filter of the converter unit of the transducer unit according to FIG. 11.

FIG. 12 shows a schematic representation of a high-pass filter 18, 18', 18" of the converter unit 1.3. Preferably, the converter unit 1.3 comprises three first electrical resistors 13.5, 13.5', 13.5". The three first electrical resistors 13.5, 13.5', 13.5" are identical in structure.

In the embodiment according to FIGS. 1 and 2, the first electrical resistor 13.5, 13.5', 13.5" is a resistive coating made of a resistive material such as $Al_2O_3$, ceramics, $Al_2O_3$ ceramics, etc. The resistive coating is fabricated by chemical vapor deposition, physical vapor deposition, etc. The resistive coating is an electrical resistor thin film. Also, the resistive coating is a "thin film" in the sense of the present invention since its thickness in a direction perpendicular to its planar extension is preferably less than 0.1 mm. The resistive coating is applied directly to the first normal side face 12.7 (first embodiment of the acceleration transducer 1 according to FIGS. 1 and 3) or the support 13.7 (second embodiment of the acceleration transducer 1 according to FIGS. 2 and 4) and/or the resistive coating is applied directly to the first and second main body conductors 13.3, 13.3', 13.3", 13.4, 13.4', 13.4". The resistive coating may be patterned by stenciling, photolithography, laser ablation, etc.

In the embodiment according to FIGS. 2 and 4, the first electrical resistor 13.5, 13.5', 13.5" is an electrical component made of resistive material like ceramics, metal oxide, etc. and connecting wires.

A first main body conductor 13.3, 13.3', 13.3" each contacts a first electrical resistor 13.5, 13.5', 13.5". Any method of contacting may be chosen. A first electrical resistor 13.5, 13.5', 13.5" each is electrically connected in parallel with one of the three piezoelectric elements 10, 10', 10". This connection in parallel is a high-pass filter 18, 18', 18" because the first, second or third piezoelectric element 10, 10', 10" is an electrical capacitor. The high-pass filter 18, 18', 18" filters, i.e., eliminates, frequencies below a cut-off frequency. The cut-off frequency is preferably 10 Hz. When the acceleration measurement by the acceleration transducer 1 starts, a discharge of the first, second or third piezoelectric element 10, 10', 10" may lead to low interference frequencies below the cut-off frequency. The low interference frequencies are present at the input of the transimpedance converter 13.10, 13.10', 13.10" and represent an undefined time constant. The low interference frequencies may falsify the acceleration measurement. Because the low interference frequencies are filtered, the transimpedance converter 13.10, 13.10', 13.10" obtains a defined time constant. The cut-off frequency may be adjusted depending on the value of the electrical resistance of the first electrical resistor 13.5, 13.5', 13.5".

Figure 13:
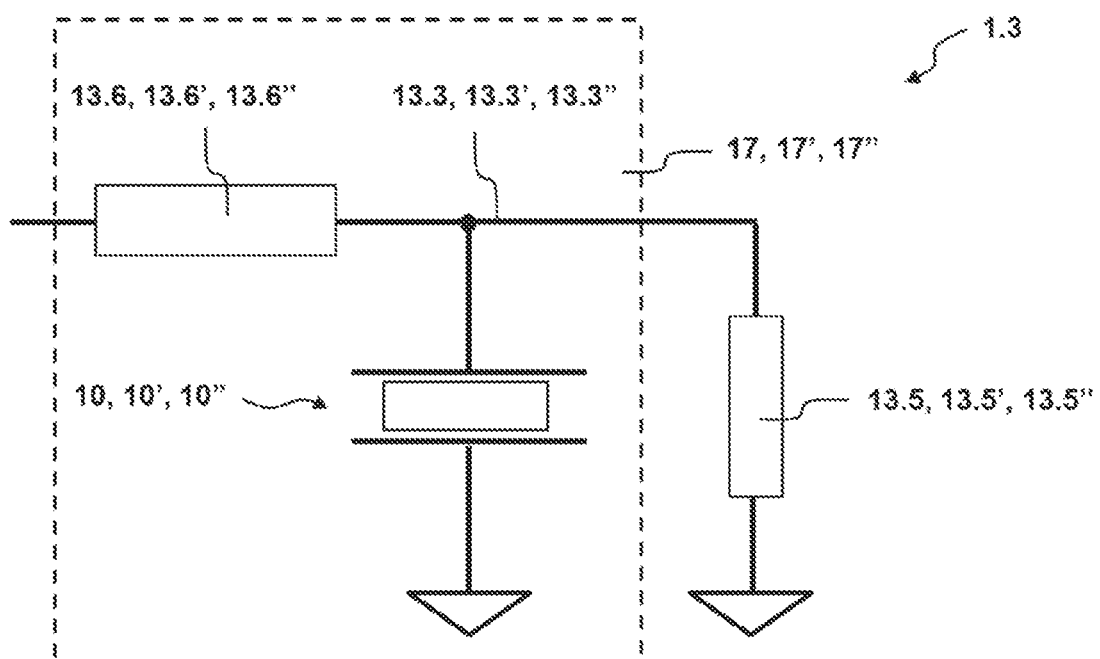
FIG. 13 shows a schematic representation of a low-pass filter of the converter unit of the transducer unit according to FIG. 11.

FIG. 13 shows a schematic representation of a low-pass filter 17, 17', 17" of the converter unit 1.3. Preferably, the converter unit 1.3 comprises three second electrical resistors 13.6, 13.6', 13.6". The three second electrical resistors 13.6, 13.6', 13.6" have an identical structure. The second electrical resistor 13.6, 13.6', 13.6" is an electrical component made of resistive material such as ceramics, metal oxide, etc. and connecting wires. A first main body conductor 13.3, 13.3', 13.3" each contacts a second electrical resistor 13.6, 13.6', 13.6". Any method of contacting may be chosen. A second electrical resistor 13.6, 13.6', 13.6" each is electrically connected in series with one of the three piezoelectric elements 10, 10', 10". This connection in series is a low-pass filter 17, 17', 17" because the first, second or third piezoelectric element 10, 10', 10" is an electrical capacitor. The low-pass filter 17, 17', 17" filters, i.e., eliminates, high interference frequencies above a natural frequency of the acceleration transducer 1. Such high interference frequencies are generated by mechanical excitation of the acceleration transducer 1. The high interference frequencies are present at the input of the transimpedance converter 13.10, 13.10', 13.10" and may saturate the transimpedance converter 13.10, 13.10', 13.10" and thus falsify the acceleration measurement. The low-pass filter 17, 17', 17" may be adjusted to the natural frequency of the acceleration transducer 1 depending on the value of the electrical resistance of the second electrical resistor 13.6, 13.6', 13.6".

Preferably, the converter unit 1.3 comprises three first main body output conductors 13.8, 13.8', 13.8". Each output of a transimpedance converter 13.10, 13.10', 13.10" contacts a first main body output contact 13.08, 13.08', 13.08" via a first main body conductor 13.3, 13.3', 13.3". Preferably, the converter unit 1.3 comprises a second main body output conductor 13.9. The second main body conductors 13.4, 13.4', 13.4" contact the second main body output conductor 13.9 via a second main body output contact 13.09. The first and second main body output contacts 13.08, 13.08', 13.08", 13.09 are secured to the first normal side face 12.7 (first embodiment of the acceleration transducer 1 according to FIGS. 1 and 3) or to the support 13.7 (second embodiment of the acceleration transducer 1 according to FIGS. 2 and 4). The first and second main body output contacts 13.08, 13.08', 13.08", 13.09 are a material bond made by wire bonding, soldering, etc. Methods such as thermocompression bonding, thermosonic ball wedge bonding, ultrasonic wedge bonding, etc. are suitable for wire bonding. The circular first and second main body exit contacts 13.08, 13.08', 13.08", 13.09 in FIG. 11 schematically represent formed wire.

The first main body output conductors 13.8, 13.8', 13.8" transmit converted first acceleration signals S1 to the signal output 1.4. The second main body output conductor 13.9 transmits the sum of the second acceleration signals S2 to the signal output 1.4.

The signal output 1.4 is secured to the housing 1.2 in some regions of the housing 1.2. According to the embodiments of the acceleration transducer 1 as shown in FIGS. 1 and 2, the signal output 1.4 preferably is an electric cable. As schematically shown in FIG. 14, the signal output 1.4 comprises signal conductors 14.1, 14.1', 14.1", 14.2, a protective sheath 14.3, a sheath flange 14.4, an electrical insulation 14.5 and casting compound 14.6.

In cross-section, the signal output 1.4 has a multilayer structure.

The signal conductors 14.1, 14.1', 14.1", 14.2 form an inner layer. Preferably, the signal output 1.4 comprises three first signal conductors 14.1, 14.1', 14.1" and one second signal conductor 14.2. The signal conductors 14.1, 14.1', 14.1", 14.2 are made of electrically conductive material such as copper, copper alloys, gold, gold alloys, aluminum, aluminum alloys, etc. Preferably, each signal conductor 14.1, 14.1', 14.1", 14.2 comprises an electrically insulating sheath. The first and second main body output conductors 13.8, 13.8', 13.8", 13.9 contact first and second signal conductors 14.1, 14.1', 14.1", 14.2. A first main body output conductor 13.8, 13.8', 13.8" each contacts a respective first signal conductor 14.1, 14.1', 14.1". The second main body output conductor 13.9 contacts the second signal conductor 14.2.

As schematically shown in FIG. 14, the electrical insulation 14.5 forms a middle layer and is arranged around the signal conductors 14.1, 14.1', 14.1", 14.2. The electrical insulation 14.5 electrically insulates the signal conductors 14.1, 14.1', 14.1", 14.2 from the protective sheath 14.3. The electrical insulation 14.5 is made of electrically insulating material such as $Al_2O_3$, ceramics, $Al_2O_3$ ceramics, fiber-reinforced plastics, etc.

The protective sheath 14.3 forms an outer layer. The protective sheath 14.3 protects the electrical insulation 14.5 as well as the signal conductors 14.1, 14.1', 14.1", 14.2 from harmful environmental impacts such as contamination (dust, moisture, etc.) as well as from electromagnetic waves which may lead to undesirable interference effects in the first and second acceleration signals S1, S2. The protective sheath 14.3 is made of mechanically resistant material such as metal, plastics, etc.

FIGS. 14 to 18 show steps in the assembly of the embodiment of the acceleration transducer 1 according to FIG. 2.

FIG. 14 shows a first step in the assembly in which signal conductors 14.1, 14.1', 14.1", 14.2 are introduced into the housing 1.2. The housing 1.2 comprises a signal output opening 1.22. Preferably, the signal output opening 1.22 has the shape and dimensions of the outer diameter of the protective sheath 14.3. The ends of the signal conductors 14.1, 14.1', 14.1", 14.2 are stripped while the electrically insulating sheath is removed in some regions here. The ends of the signal conductors 14.1, 14.1', 14.1", 14.2 project through the signal output opening 1.22 into an inner space of the housing 1.2. The inner space of the housing 1.2 is the space around the housing bottom 1.23.

The signal output opening 1.22 is sealed from the outside by the protective sheath 14.3 and the sheath flange 14.3. Preferably, one end of the protective sheath 14.3 is attached to the sheath flange 14.4. The sheath flange 14.4 is made of mechanically resistant material such as metal, plastics, etc. The connection of protective sheath 14.3 and sheath flange 14.4 is achieved by a force connection such as crimping, etc.

The metal flange 14.4 itself is fastened to the housing 1.2 by a material bond. Preferably, the metal flange 14.4 is fastened to an outer edge of the housing opening 1.22 that faces away from the interior of the housing 1.2. The material bond is made by welding, soldering, gluing, etc. The connection between the sheath flange 14.4 and the housing 1.2 causes a relief of strain on the protective sheath 14.3. Due to this strain relief of the protective sheath 14.3, mechanical loads are not transmitted from the protective sheath 14.3 into the interior of the housing 1.2 where they may reach the converter unit 1.3 and cause damage such as tearing or rupture of main body output conductors 13.8, 13.8', 13.8", 13.9. Such mechanical stresses originate from twisting, torsion, etc. of the protective sheath 14.3 about its extension along the longitudinal axis.

FIG. 15 shows a second step in the assembly in which the signal conductors 14.1, 14.1', 14.1", 14.2 are cast with casting compound 14.6 within the housing 1.2. The casting compound 14.6 is applied through the housing opening 1.20 to the signal conductors 14.1, 14.1', 14.1", 14.2 in the signal output opening 1.21. The casting compound 14.6 is an adhesive that can be chemically cured or an adhesive that can be physically hardened or a combination of a chemically cured adhesive and a physically hardened adhesive. Preferably, the casting compound 14.6 consists of an adhesive such as epoxy, polyurethane, cyanoacrylate, methyl methacrylate, etc. The casting compound 14.6 is an electrical insulator having an electrical resistivity of more than $10^{12}$ $\Omega mm^2/m$. Preferably, enough casting compound 14.6 to completely seal the signal output opening 1.21 is applied to the signal conductors 14.1, 14.1', 14.1", 14.2 in the signal output opening 1.21.

FIG. 16 shows a third step in the assembly in which the signal conductors 14.1, 14.1', 14.1", 14.2 cast in casting compound 14.6 are exposed in some areas within the housing 1.2. The exposure 14.7 of the signal conductors 14.1, 14.1', 14.1", 14.2 is achieved by a suitable cutting tool such as a cutting wedge, a milling cutter, etc. The cutting tool is introduced into the interior of the housing 1.2 through the housing opening 1.20 and cuts off the ends of the signal conductors 14.1, 14.1', 14.1", 14.2 as well as a portion of the cured casting compound 14.6. The exposure 14.7 is in a horizontal plane defined by the transverse axis x and the longitudinal axis y. In the area of the exposure 14.7, the end faces of cut ends of the signal conductors 14.1, 14.1', 14.1", 14.2 are exposed in one plane. Preferably, the plane is parallel to the housing opening 1.20. In the area of the exposure 14.7, the lateral surfaces of the signal conductors 14.1, 14.1', 14.1", 14.2 are completely covered by casting compound 14.6. The casting compound 14.6 secures the signal conductors 14.1, 14.1', 14.1", 14.2 in a strain-relieved manner. Due to this strain relief of the signal conductors 14.1, 14.1', 14.1", 14.2, mechanical loads are not transmitted from the signal conductors 14.1, 14.1', 14.1", 14.2 into the interior of the housing 1.2 where they may reach the converter unit 1.3 and lead to damage such as a tearing or rupture of main body output conductors 13.8, 13.8', 13.8", 13.9. Such mechanical stresses originate from twisting, torsion, etc. of signal conductors 14.1, 14.1', 14.1", 14.2 about their extension along the longitudinal axis. Furthermore, the casting compound 14.6 seals the signal output opening 1.21 in a gas-tight manner. The gas-tight seal of the signal output opening 1.21 prevents moisture from entering via the signal conductors 14.1, 14.1', 14.1", 14.2 into the interior of the housing 1.2 up to the transducer unit 1.1 where moisture might impair the functioning of the piezoelectric elements 10, 10', 10" since piezoelectric material such as quartz is strongly hygroscopic.

Figure 17:
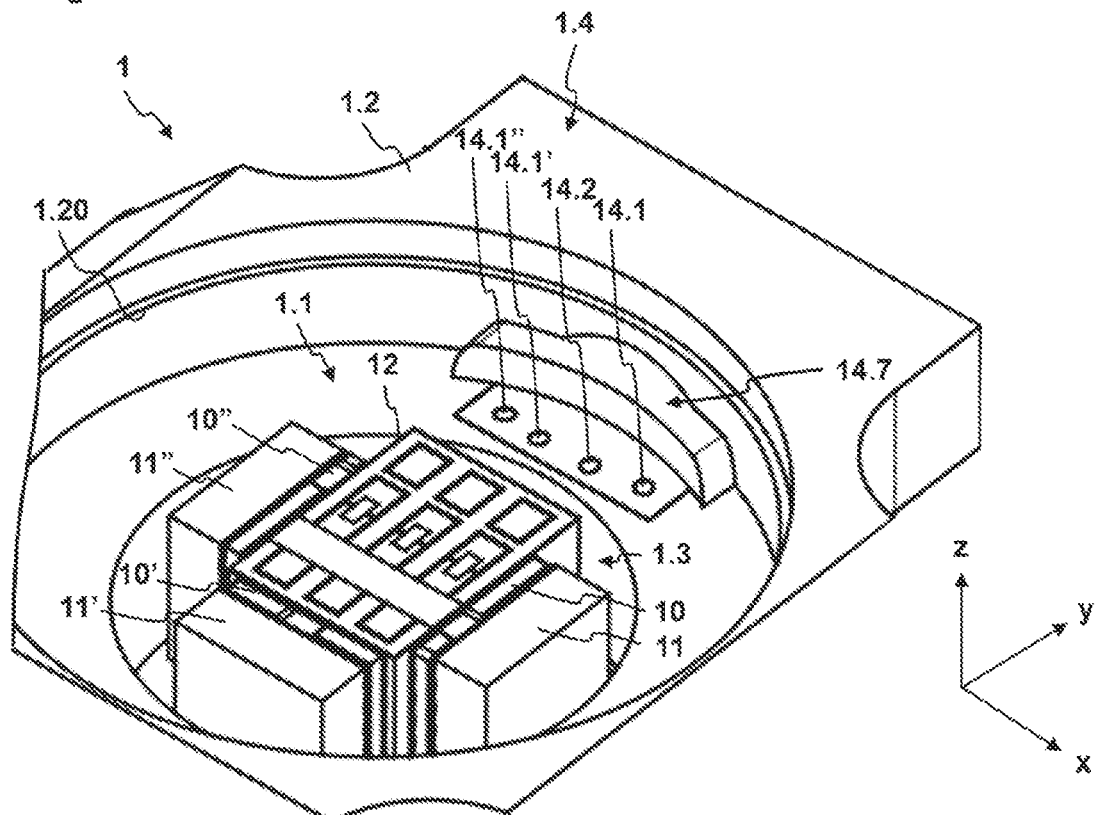
FIG. 17 shows a view of a fourth step in the assembly of the acceleration transducer according to FIG. 2 in which the transducer unit is introduced into the housing.

FIG. 17 shows a fourth step in the assembly in which the transducer unit 1.1 is introduced into the housing 1.2. The transducer unit 1.1 together with the converter unit 1.3 is introduced through the housing opening 1.20 into the interior of the housing 1.2. The second normal side face 12.6 is secured to the housing bottom 1.23 by means of a material bond such as bonding, soldering, etc. Preferably, the transducer unit 1.1 is arranged with the fourth tangential side face 12.4 in the proximity of the exposure 14.7.

Figure 18:
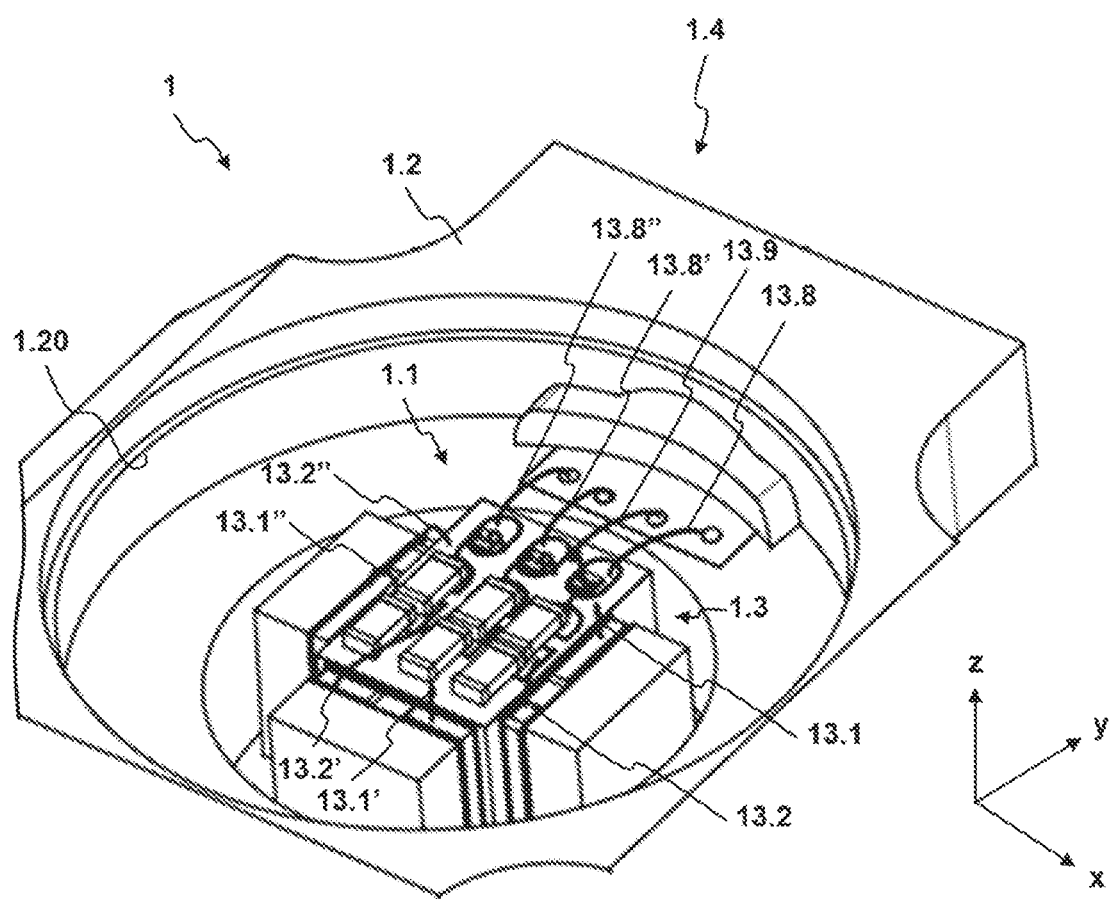
FIG. 18 shows a view of a fifth step in the assembly of the acceleration transducer according to FIG. 2 in which the converter unit of the transducer unit is electrically connected.

FIG. 18 shows a fifth step in the assembly in which the converter unit 1.3 of the transducer unit 1.1 is contacted. Contacting of the converter unit 1.3 is performed by a suitable contacting tool such as a wire bonder, etc. The contacting tool is introduced into the interior of the housing 1.2 through the housing opening 1.20. The contacting tool connects first and second main body conductors 13.3, 13.3', 13.3", 13.4, 13.4', 13.4" of the converter unit 1.3 via first and second piezoelectric element conductors 13.1, 13.1', 13.1", 13.2, 13.2', 13.2" to the first lateral surface 130 of the first, second or third piezoelectric element 10, 10', 10". In addition, the contacting tool connects first and second main body conductors 13.3, 13.3', 13.3", 13.4, 13.4', 13.4" of the converter unit 1.3 to the signal conductors 14.1, 14.1', 14.1", 14.2 of the signal output 1.4 via first and second main body output conductors 13.8, 13.8', 13.8", 13.9.

Preferably, the first and second main body output conductors 13.8, 13.8', 13.8", 13.9 are directly connected to end faces of cut ends of the signal conductors 14.1, 14.1', 14.1", 14.2. This direct contacting of the first and second main body output conductors 13.8, 13.8', 13.8", 13.9 with the signal conductors 14.1, 14.1', 14.1", 14.2 has the advantage that no further supporting means such as a printed circuit board, etc. is necessary which keeps the dimensions and weight of the acceleration transducer low and makes the assembly of the acceleration transducer simple and inexpensive. This direct contacting of the first and second main body output conductors 13.8, 13.8', 13.8", 13.9 with the signal conductors 14.1, 14.1', 14.1", 14.2 has the further advantage that the converter unit 1.3 is connected to the signal conductors 14.1, 14.1', 14.1", 14.2 in a strain-relieved manner by the mechanically flexible main body output conductors 13.8, 13.8', 13.8", 13.9, i.e., the mechanically flexible main body output conductors 13.8, 13.8', 13.8", 13.9 damp mechanical stresses penetrating up to the signal conductors 14.1, 14.1', 14.1", 14.2.

When the electrical contacting of the converter unit 1.3 is completed, the housing opening 1.20 is sealed in a gas-tight manner by the housing cover 1.21. The seal is made by material bonding such as welding, soldering, gluing, etc.

LIST OF REFERENCE NUMERALS 1 acceleration transducer
1.1 transducer unit
1.2 housing
1.20 housing opening
1.21 housing cover
1.22 signal output opening
1.23 housing bottom
1.24 assembly gap
1.3 converter unit
1.4 signal output
10, 10', 10" piezoelectric element
11, 11', 11" seismic mass
12 main body
12.1, 12.2, 12.3, 12.4 tangential side face
12.6, 12.7 normal side face
13.01, 13.01', 13.01" first piezoelectric element contact
13.02, 13.02', 13.02" second piezoelectric element contact
13.03, 13.03', 13.03" first main body access contact
13.04, 13.04', 13.04" second main body access contact
13.08, 13.08', 13.08" first main body output contact
13.09 second main body output contact
13.1, 13.1', 13.1" first piezoelectric element conductor
13.2, 13.2', 13.2" second piezoelectric element conductor
13.3, 13.3', 13.3" first main body conductor 13.4, 13.4', 13.4" second main body conductor
13.5, 13.5', 13.5" first electrical resistor
13.6, 13.6', 13.6" second electrical resistor
13.7 support
13.8, 13.8', 13.8" first main body output conductor
13.9 second main body output conductor
13.10, 13.10', 13.10" transimpedance converter
14.1, 14.1', 14.1" first signal conductor
14.2 second signal conductor
14.3 protective sheath
14.4 sheath flange
14.5 electrical insulation
14.6 casting compound
14.7 exposure
15, 15', 15" inner connecting means
16, 16', 16" outer connecting means
17, 17', 17" low pass filter
18, 18', 18" high pass filter
101 first electrically conductive coating
102 second electrically conductive coating
110, 120 end face
111, 111' first electrically conductive end face coating
112, 112', 112" first uncoated end face area
121-121''' second electrically conductive end face coating
122, 122', 122" second uncoated end face area
130, 140, 150, 160 lateral surface
131, 131' first electrically conductive lateral surface coating
132, 132'-132"" first uncoated lateral surface area
133, 133' further first electrically conductive lateral surface coating
141 second electrically conductive lateral surface coating
142, 142', 142" second uncoated lateral surface area
151, 151' third electrically conductive lateral surface coating
161 fourth electrically conductive lateral surface coating
a normal axis
F force
h principal tangential axis
n secondary tangential axis
S1, S2 acceleration signals
x transverse axis
y longitudinal axis
z vertical axis

What is claimed is:

1. An acceleration transducer arranged in a rectangular coordinate system with three mutually orthogonal axes, one of the three axes being a transverse axis, one of the three axes being a longitudinal axis, one of the three axes being a vertical axis, the acceleration transducer comprising:
a housing;
a main body disposed within the housing and defining a first tangential side face lying in a first plane, a second tangential side face lying in a second plane that is disposed spaced apart from and normal to the first plane, a third tangential side face lying in a third plane that is disposed spaced apart from and parallel to the first plane, and a fourth tangential side face lying in a fourth plane that is disposed spaced apart from and parallel to the second plane, wherein each of the first, second, third and fourth tangential side faces is disposed tangentially to the vertical axis;
wherein the main body further defines a lower normal side face lying in a fifth plane that is normal to each of the first, second, third and fourth planes, and wherein the main body further defines an upper normal side face lying in a sixth plane that is disposed spaced apart along the vertical axis from and parallel to the fifth plane;
exactly three piezoelectric elements, which include only a first piezoelectric element secured to the first tangential side face, a second piezoelectric element secured to the second tangential side face, and a third piezoelectric element secured to the third tangential side face;
exactly three seismic masses, which include only a first seismic mass secured to the first piezoelectric element so that acceleration of the first seismic mass exerts on the first piezoelectric element a first shear force proportional to the acceleration, a second seismic mass secured to the second piezoelectric element so that acceleration of the second seismic mass exerts on the second piezoelectric element a second shear force proportional to the acceleration, and a third seismic mass secured to the third piezoelectric element so that acceleration of the third seismic mass exerts on the third piezoelectric element a third shear force proportional to the acceleration, wherein each of the three piezoelectric elements generates piezoelectric charges under the action of each respective shear force; and
a signal output attached to the housing and including a signal conductor that is spaced apart by an assembly gap from the fourth tangential side face to which no piezoelectric element is attached, wherein the assembly gap extends in a direction perpendicularly to the vertical axis;
a main body output conductor spanning the assembly gap perpendicularly to the vertical axis and directly connected to the signal conductor, wherein the main body output conductor is defined by one of the following: the lower normal side face of the main body, the upper normal side face of the main body, a support that is attached to either the lower normal side face of the main body or to the upper normal side face of the main body;
wherein each of the three piezoelectric elements defines end faces; and
wherein each of the three piezoelectric elements is configured with a high sensitivity for a shear force exerted by the respective seismic mass secured to each of the three piezoelectric elements; and
wherein each of the three piezoelectric elements is further configured to generate piezoelectric charges on the end faces under the action of the shear force;
wherein the piezoelectric element comprises lateral surfaces;
wherein a first end face comprises a first electrically conductive end face coating;
wherein a second end face comprises a second electrically conductive end face coating;
wherein a first lateral surface comprises a first electrically conductive lateral surface coating and a further first electrically conductive lateral surface coating;
wherein the first electrically conductive end face coating and the first electrically conductive lateral surface coating form a continuous first electrically conductive coating; and
wherein the second electrically conductive end face coating and the further first electrically conductive lateral surface coating form a continuous second electrically conductive coating.

2. The acceleration transducer according to claim 1, further comprising a converter unit that is attached to the lower normal side face or to the support attached to the lower normal side face;

wherein the converter unit includes a plurality of first piezoelectric element conductors and a plurality of second piezoelectric element conductors;

wherein the first electrically conductive lateral surface coating is materially bonded to a first one of the plurality of first piezoelectric element conductors;

wherein the further first electrically conductive lateral surface coating is materially bonded to a first one of the plurality of second piezoelectric element conductors;

wherein the first one of the plurality of first piezoelectric element conductors is configured to receive piezoelectric charges from the first electrically conductive lateral surface coating and configured to transmit them as the first acceleration signals; and wherein the first one of the plurality of second piezoelectric element conductors is configured to receive piezoelectric charges from the further first electrically conductive lateral surface coating and configured to transmit them as the second acceleration signals.

3. The acceleration transducer according to claim 2, wherein the converter unit comprises a plurality of first main body conductors and a plurality of second main body conductors and a plurality of transimpedance transducers;

wherein the first one of the plurality of first piezoelectric element conductors is contacted with a first one of the plurality of first main body conductors;

wherein a first one of the plurality of first main body conductors is configured to transmit the first acceleration signals to a first one of the plurality of transimpedance transducers, which the transimpedance converter is configured to convert the first acceleration signals;

wherein a first one of the plurality of second piezoelectric element conductors is contacted with a first one of the plurality of second main body conductors; and wherein the first one of the plurality of second main body conductors is configured to transmit the second acceleration signals.

4. The acceleration transducer according to claim 3, wherein the first one of the plurality of first main body conductors is contacted with a first one of a plurality of first main body output conductors, which is configured to transmit the converted first acceleration signals to the signal output; and wherein the first one of the plurality of second main body conductors is contacted with a second main body output conductor, which is configured to transmit the converted second acceleration signals to the signal output.

5. An acceleration transducer arranged in a rectangular coordinate system with three mutually orthogonal axes, one of the three axes being a transverse axis, one of the three axes being a longitudinal axis, one of the three axes being a vertical axis, the acceleration transducer comprising:

a housing defining a housing bottom and defining a housing opening disposed opposite the housing bottom, wherein the housing further defining a cable opening;

a main body disposed within the housing and defining a cuboid shape that includes:

an upper end defining an upper end face lying in an upper plane that is normal to the vertical axis, a lower end connected to the housing bottom and defining a lower end face spaced apart along the vertical axis from the upper end face and lying in a lower plane that is normal to the vertical axis and parallel to the upper plane, a first tangential side face lying in a first plane and connected between the upper end face and the lower end face, a second tangential side face lying in a second plane that is parallel to the first plane and spaced apart from the first tangential side face along the transverse axis and connected between the upper end face and the lower end face, a third tangential side face lying in a third plane and connected between the upper end face, the lower end face, the first tangential side face and the second tangential side face, and a fourth tangential side face lying in a fourth plane parallel to and spaced apart from the third plane along the longitudinal axis and connected between the upper end face, the lower end face, the first tangential side face and the second tangential side face, wherein the fourth tangential side face is disposed facing the cable opening of the housing and spaced apart from the housing along the longitudinal axis to define an assembly gap between the housing and the main body;

a first piezoelectric element secured to the first tangential side face;

a second piezoelectric element secured to the second tangential side face;

a third piezoelectric element secured to the third tangential side face;

a first seismic mass secured to the first piezoelectric element so that acceleration of the first seismic mass exerts on the first piezoelectric element a first shear force proportional to the acceleration and the first piezoelectric element generates piezoelectric charges proportional to the first shear force;

a second seismic mass secured to the second piezoelectric element so that acceleration of the second seismic mass exerts on the second piezoelectric element a second shear force proportional to the acceleration and the second piezoelectric element generates piezoelectric charges proportional to the second shear force;

a third seismic mass secured to the third piezoelectric element so that acceleration of the third seismic mass exerts on the third piezoelectric element a third shear force proportional to the acceleration and the third piezoelectric element generates piezoelectric charges proportional to the third shear force; and a cable disposed to pass through the cable opening in the housing, wherein the cable includes a first signal conductor electrically coupled to the first piezoelectric element, a second signal conductor electrically coupled to the second piezoelectric element, and a third signal conductor electrically coupled to the third piezoelectric element.

6. The acceleration transducer according to claim 5, wherein the housing defines an interior;

wherein the main body is configured so that the main body may be inserted into the interior of the housing through the housing opening; and wherein the lower end face of the main body is materially bonded to the housing bottom.

7. The acceleration transducer according to claim 5, wherein the cable is guided through the cable opening into the interior of the housing.

8. The acceleration transducer according to claim 7, wherein the cable opening is defined by a metal flange that includes an outer edge secured to the housing.

9. The acceleration transducer according to claim 7, further comprising a casting compound attached to the cable within the interior of the housing;
- wherein the casting compound attaches each of the first signal conductor, the second signal conductor and the third signal conductor in a strain-relieved manner; and
- wherein the casting compound seals the cable opening in a gas-tight manner.

10. The acceleration transducer according to claim 5, wherein the first piezoelectric element has a high sensitivity for a shear force exerted by the first seismic mass along the longitudinal axis and generates piezoelectric charges under the action of the shear force along the longitudinal axis;
- wherein the second piezoelectric element has a high sensitivity for a shear force exerted by the second seismic mass along the transverse axis and generates piezoelectric charges under the action of the shear force along the transverse axis; and
- wherein the third piezoelectric element has a high sensitivity for a shear force exerted by the third seismic mass along the vertical axis and generates piezoelectric charges under the action of the shear force along the vertical axis.

11. A method of assembly of an acceleration transducer, the method comprising the following steps:
- providing a housing with an interior is partially defined by a housing bottom and that comprises a housing opening into the interior and a signal output opening into the interior;
- providing a signal output with a plurality of signal conductors;
- inserting the signal conductors into the interior of the housing through the signal output opening;
- using a casting compound to cast the signal conductors within the housing;
- wherein the signal conductors are secured by the casting compound in a strain-relieved manner;
- wherein the signal output opening is sealed by the casting compound in a gas-tight manner;
- providing a main body that includes normal side faces and tangential side faces, wherein the tangential side faces are arranged tangentially to a vertical axis and wherein the normal side faces are arranged normally to the vertical axis;
- providing a piezoelectric element that includes a lateral surface having a first electrically conductive lateral surface coating and a further first electrically conductive lateral surface coating;
- attaching the piezoelectric element to a tangential side face of the main body;
- providing a seismic mass;
- attaching the seismic mass to the piezoelectric element;
- providing a converter unit that includes piezoelectric element conductors and main body output conductors;
- connecting the converter unit to one of the normal side faces of the main body;
- inserting the main body into the interior of the housing through the housing opening; that a tangential side face to which no piezoelectric element is attached is arranged spaced apart from the signal output by an assembly gap; and in that the main body is materially bonded to the housing bottom via a second normal side face.

12. The method of assembly of an acceleration transducer according to claim 11, wherein the step of connecting the converter unit to one of the normal side faces of the main body includes the step of attaching one of the normal side faces of the main body to a support and attaching the support to the converter unit.

13. The method of assembly of an acceleration transducer according to claim 11, further comprising the steps of:
- materially bonding the first electrically conductive lateral surface coating to one of the piezoelectric element conductors;
- materially bonding the further first electrically conductive lateral surface coating to another of the piezoelectric element conductors;
- materially bonding the main body output conductors to the signal conductors; and
- using a housing cover to seal the housing opening in a gas-tight manner.

* * * * *